(12) United States Patent
Williams

(10) Patent No.: US 12,022,537 B2
(45) Date of Patent: Jun. 25, 2024

(54) WIRELESS LINK PAIRING AUTHENTICATION

(71) Applicant: HILL-ROM SERVICES, INC., Batesville, IN (US)

(72) Inventor: Jason M. Williams, Cary, NC (US)

(73) Assignee: HILL-ROM SERVICES, INC., Batesville, IN (US)

( * ) Notice: Subject to any disclaimer, the term of this patent is extended or adjusted under 35 U.S.C. 154(b) by 192 days.

(21) Appl. No.: 17/517,357

(22) Filed: Nov. 2, 2021

(65) Prior Publication Data

US 2022/0150992 A1 May 12, 2022

Related U.S. Application Data

(60) Provisional application No. 63/110,689, filed on Nov. 6, 2020.

(51) Int. Cl.
*H04W 76/11* (2018.01)
*H04L 67/12* (2022.01)

(52) U.S. Cl.
CPC ............ *H04W 76/11* (2018.02); *H04L 67/12* (2013.01)

(58) Field of Classification Search
CPC ......... H04W 4/35; H04W 76/19; H04W 4/50; H04W 76/15; H04W 76/11; H04L 67/12
See application file for complete search history.

(56) References Cited

U.S. PATENT DOCUMENTS

| | | | |
|---|---|---|---|
| 7,636,549 B2 | 12/2009 | Ma et al. | |
| 7,768,949 B2 | 8/2010 | Perkins et al. | |
| 8,515,070 B2 | 8/2013 | Juels et al. | |
| 8,799,011 B2 | 8/2014 | Wilson et al. | |
| 9,762,558 B2 | 9/2017 | Modzelewski et al. | |
| 9,830,424 B2 | 11/2017 | Dixon et al. | |
| 9,937,090 B2 | 4/2018 | Hayes et al. | |
| 9,980,140 B1 | 5/2018 | Spencer et al. | |

(Continued)

FOREIGN PATENT DOCUMENTS

| | | |
|---|---|---|
| EP | 3 748 646 A1 | 12/2020 |
| GB | 2561544 A | 10/2018 |
| WO | 2008/103177 A1 | 8/2008 |

OTHER PUBLICATIONS

Extended European Search Report for Appln. No. 21206497.6 dated Mar. 28, 2022, 8 pages.

(Continued)

*Primary Examiner* — Iqbal Zaidi
(74) *Attorney, Agent, or Firm* — Dinsmore & Shohl LLP

(57) ABSTRACT

Systems and methods include a control device that matches a first identifier received over its first communication channel and associated with a medical device with a second identifier received over its second communication channel as well as a receiver device that receives the second identifier from the medical device via a third communication channel from the medical device and transmits the second identifier to the control device via the second communication channel. The control device, upon determining that the first identifier received over the first communication channel, matches the second identifier received over the second communication channel and automatically pairs with the medical device associated with the matching identifier over the second communication channel.

18 Claims, 10 Drawing Sheets

(56) References Cited

U.S. PATENT DOCUMENTS

| | | |
|---|---|---|
| 10,097,948 B2 | 10/2018 | Rajapaksa et al. |
| 10,512,422 B2 | 12/2019 | Hayes et al. |
| 10,638,983 B2 | 5/2020 | Schuman et al. |
| 10,679,489 B2 | 6/2020 | Bodurka et al. |
| 10,716,474 B2 | 7/2020 | Bodurka et al. |
| 2007/0184847 A1 | 8/2007 | Hansen et al. |
| 2012/0003933 A1 | 1/2012 | Baker et al. |
| 2015/0023204 A1 | 1/2015 | Wik et al. |
| 2017/0229009 A1 | 8/2017 | Foster et al. |
| 2018/0015218 A1 | 1/2018 | Welsch |
| 2018/0174683 A1 | 6/2018 | Franz et al. |
| 2018/0317826 A1* | 11/2018 | Muhsin ................ G16H 40/40 |
| 2019/0183705 A1 | 6/2019 | Bodurka |
| 2020/0203010 A1 | 6/2020 | Durlach et al. |
| 2020/0294392 A1* | 9/2020 | Peesapati ............... G16H 40/67 |
| 2022/0101980 A1* | 3/2022 | Rothenberg ........... G16H 50/20 |

OTHER PUBLICATIONS

Dan Yang, et al.; "Passive Infrared (PIR)-Based Indoor Position Tracking for Smart Homes Using Accessibility Maps and A-Star Algorithm"; Sensors 2018, 18, 332; pp. 1-12; Jan. 24, 2018; www.mdpi.com/journal/sensors; and https://www.ncbi.nlm.nih.gov/pmc/articles/PMC5855945/.

* cited by examiner

WIRELESS LINK PAIRING AUTHENTICATION

CROSS-REFERENCE TO RELATED APPLICATIONS

This application is a non-provisional application and claims priority to U.S. Provisional Patent Application No. 63/110,689, filed Nov. 6, 2020, entitled "Wireless Link Pairing Authentication" which is hereby incorporated by reference in its entirety including the drawings.

BACKGROUND

Field

The present disclosure generally relates to systems and/or methods for pairing a medical device, a receiver device, and a control device, and more specifically, to systems and/or methods for pairing a medical device, a receiver device, and a control device using line-of-sight optical and/or a wireless links.

Technical Background

A medical facility may include a plurality of rooms where each room may include one or more medical devices. Each medical device (MD) may be permanently fixed within a room or movable between the plurality of rooms. In addition, each medical device may be wirelessly controlled by a respective control device (CD) and the control device may be permanently fixed within a room or movable between the plurality of rooms. Accordingly, given the portable nature of medical devices and/or control devices, systems and/or methods are desirable to ensure that a particular control device is in wireless communication with a particular medical device.

Existing methods require some form of user intervention to either place pairable devices in a discoverable state and/or manually select from a list of detected, pairable devices with which to pair. Placing a device in a discoverable state may be inconvenient to the user and/or difficult for the user to remember or perform, and manual selection of a device may result in the user selecting the wrong device. Additionally, current automated pairing methods rely on line-of-sight between the two devices pairing with one another. For example, an infrared (IR) receiver on a wall unit, such as the control device, would have to be in a line-of-sight position to capture the transmission from an IR transmitter mounted on a bed, such as the medical device, in some fixed position. This can be problematic because hospital rooms have varied layouts and designs. Some wall unit control devices are mounted at an angle, even 90 degrees, with respect to the bed. They could also be mounted at shoulder-height, for example, while the bed transmitter may be down low near the floor. With the bed pushed up against the wall, this would prevent reliable IR communication between the two.

Ultimately, none of these methods is preferred since the user's focus is taken off of a subject.

SUMMARY

In one aspect, an automatically pairable control device may include a first communication system configured to communicate via a first communication channel and a second communication system configured to communicate via a second communication channel different from the first communication channel. The automatically pairable control device may also include a processor and a memory storing program instructions. The program instructions, when executed by the processor, cause the processor to receive, from a medical device, a first identifier associated with the medical device over the first communication channel. The program instructions also cause the processor to receive, from a receiver device, a second identifier associated with the medical device over the second communication channel. The program instructions further cause the processor to determine that the first identifier received over the first communication channel matches the second identifier received over the second communication channel. The program instructions further cause the processor to automatically pair with the medical device associated with the matching identifier over the second communication channel.

In such an aspect, according to some aspects, the first communication channel and the second communication channel are wireless communication channels. In another aspect, a third communication channel is a wireless communication channel or an optical communication channel, or the receiver device comprises a camera to visually detect a visual identifier located in a line of sight between the receiver device and the medical device. In yet another aspect, the program instructions, when executed by the processor, may further cause the processor to receive status data from the medical device over the first communication channel associated with the matching identifier, and transmit control inputs to the medical device over the first communication channel associated with the matching identifier, the control inputs for controlling a function of the medical device. In a further aspect, the optical communication channel is an infrared (IR) communication channel and the wireless communication channels are radio frequency (RF) communication channels. In an additional aspect, the program instructions, when executed by the processor, further cause the processor to determine that at least one of the first communication channel or the second communication channel is associated with a signal below a predetermined threshold strength, and disassociate from the medical device associated with the matching identifier. In yet another aspect, the program instructions, when executed by the processor, further cause the processor to automatically disassociate from the medical device based on the first identifier is no longer being detected over the first communication channel or the second identifier no longer being detected over the first communication channel.

In another aspect, a system for automatically pairing devices may include an automatically pairable control device that may include a first communication system configured to communicate via a first communication channel, a second communication system configured to communicate via a second communication channel different from the first communication channel, a processor, and a memory storing program instructions. The program instructions, when executed by the processor, cause the processor to receive, from an automatically pairable medical device, a first identifier associated with the medical device over the first communication channel. The program instructions further cause the processor to receive, from a receiver device paired with the control device, a second identifier associated with the medical device over the second communication channel. The program instructions additionally cause the processor to determine that the first identifier received over the first communication channel matches the second identifier received over the second communication channel. The program instructions further automatically pair with the medical device associated with the matching identifiers over the second communication channel. The receiver device, paired with the control device, may be configured to receive, from the medical device, the second identifier associated with the medical device over a third communication channel different from the first communication channel and the third communication channel. The receiver device may further be configured to transmit, to the control device, the second identifier associated with the medical device over the second communication channel.

In such another aspect, according to some aspects, the first communication channel and the second communication channel are wireless communication channels. In other aspects, the third communication channel is a wireless communication channel or an optical communication channel, or the receiver device comprises a camera to visually detect a visual identifier located in a line of sight between the receiver device and the medical device. In another aspect, the program instructions, when executed by the processor, further cause the processor to transmit control inputs to the medical device associated with the matching identifier, the control inputs for controlling a function of the medical device. In yet another aspect, the optical communication channel is an infrared (IR) communication channel and the wireless communication channels are radio frequency (RF) communication channels. In still another aspect, the program instructions, when executed by the processor, further cause the processor to determine that at least one of the first communication channel or the second communication channel is associated with a signal below a predetermined threshold strength and disassociate from the medical device associated with the matching identifier. In a further aspect, the program instructions, when executed by the processor, further cause the processor to automatically disassociate the control device from the medical device based on the first identifier no longer being detected over the first communication channel or the second identifier no longer being detected over the first communication channel. In still another aspect, the control device further comprises a visual indicator, and wherein the program instructions, when executed by the processor, further cause the processor to update the visual indicator to reflect that the medical device is not within a line-of-sight of the receiver device.

In a further aspect, a system for automatically pairing devices may include an automatically pairable control device that may include a first communication system configured to communicate via a first communication channel, and a second communication system configured to communicate via a second communication channel different from the first communication channel, a processor, and a memory storing program instructions. The program instructions, when executed by the processor, cause the processor to receive, from an automatically pairable medical device, a first identifier associated with the medical device over the first communication channel. The program instructions further cause the processor to receive, from a receiver device paired with the control device, a second identifier associated with the medical device over the second communication channel. The program instructions further cause the processor to determine that the first identifier received over the first communication channel matches the second identifier received over the second communication channel. The program instructions further automatically pair, over the first communication channel, with the control device with the medical device associated with the matching identifiers. The receiver device, paired with the control device, may include a communication system configured to communicate via a third communication channel different from the first communication channel and the third communication channel. The receiver device may be additionally configured to receive, from the medical device, the second identifier associated with the medical device over the third communication channel. The receiver device may further be configured to transmit, to the control device, the second identifier associated with the medical device over the second communication channel. The automatically pairable medical device may be further configured to transmit, to the automatically pairable control device, the first identifier associated with the medical device over the first communication channel. The automatically pairable medical device may also be configured to transmit, to the receiver device, the first identifier associated with the medical device over the second communication channel.

In such a further aspect, according to some aspects, the first communication channel and the second communication channel are wireless communication channels. In others aspects, the third communication channel is a wireless communication channel or an optical communication channel, or the receiver device comprises a camera to visually detect a visual identifier located in a line of sight between the receiver device and the medical device. In another aspect, the program instructions, when executed by the processor, further cause the processor to transmit control inputs to the medical device associated with the matching identifier, the control inputs for controlling a function of the medical device. In still another aspect, the optical communication channel is an infrared (IR) communication channel and the wireless communication channels are radio frequency (RF) communication channels. In an additional aspect, the program instructions, when executed by the processor, further cause the processor to determine that at least one of the first communication channel or the second communication channel is associated with a signal below a predetermined threshold strength, and disassociate from the medical device associated with the matching identifier. In a further additional aspect, the program instructions, when executed by the processor, further cause the processor to automatically disassociate the control device from the medical device based on the first identifier no longer being detected over the first communication channel or the second identifier no longer being detected over the first communication channel. In yet another aspect, the control device further comprises a visual indicator, and wherein the program instructions, when executed by the processor, further cause the processor to update the visual indicator to reflect that the medical device is not within a line-of-sight of the receiver device.

In yet another aspect, a method for automatically pairing a medical device with a control device via a receiver device may include receiving, via a first communication channel, an identifier associated with a medical device. The method may further include receiving, via a second communication channel different from the first communication channel, a second identifier associated with the medical device. The method may also include determining that the first identifier received over the first communication channel matches the second identifier received over the second communication channel. The method may additionally include automatically pairing the control device with the medical device associated with the matching identifiers over the first communication channel.

In such yet another aspect, according to some aspects, the first communication channel and the second communication channel are wireless communication channels. In other aspects, the third communication channel is a wireless communication channel or an optical communication channel, or the receiver device comprises a camera to visually detect a visual identifier located in a line of sight between the receiver device and the medical device. Still other aspects include receiving status data from the medical device over the first communication channel associated with the matching identifier, and transmitting control inputs to the medical device over the first communication channel associated with the matching identifier, the control inputs for controlling a function of the medical device. In further aspects the optical communication channel is an infrared (IR) communication channel and the wireless communication channels are radio frequency (RF) communication channels.

In yet a further aspect, a method for automatically pairing a control device with a medical device via a control device may include receiving from the medical device, at the control device via a first communication channel, a first identifier associated with the medical device. The method may further include receiving from the medical device, at the receiver device via a third communication channel different from the first communication channel, a second identifier associated with the medical device. The method may additionally include transmitting, from the receiver device, the second identifier associated with the medical device via a second communication channel different from the first communication channel and the third communication channel, to the control device. The method may also include determining, at the control device, that the first identifier received over the first communication channel matches the second identifier received over the second communication channel. The method may also further include automatically pairing the control device with the medical device associated with the matching identifiers over the first communication channel.

In such yet a further aspect, according to some aspects, the first communication channel and the second communication channel are wireless communication channels. In some further aspects the third communication channel is a wireless communication channel or an optical communication channel, or the receiver device comprises a camera to visually detect a visual identifier located in a line of sight between the receiver device and the medical device. Such additional aspect may further include receiving status data from the medical device over the first communication channel associated with the matching identifier, and transmitting control inputs from the control device to the medical device over the first communication channel associated with the matching identifier, the control inputs for controlling a function of the medical device. In some additional aspects, the optical communication channel is an infrared (IR) communication channel and the wireless communication channel are frequency (RF) communication channels. Some additional aspects include determining that at least one of the first communication channel or the second communication channel is associated with a signal below a predetermined threshold strength, and disassociating the control device from the medical device associated with the matching identifier. Still other aspects may include automatically disassociating from the medical device based on the first identifier is no longer being detected over the first communication channel or the second identifier no longer being detected over the first communication channel.

In still a further aspect, a method for automatically pairing a control device with a medical device via a control device may include transmitting to the control device, from the medical device via a first communication channel, a first identifier associated with the medical device. The method may further include receiving from the medical device, at the control device via the first communication channel, the first identifier associated with the medical device. The method may also include transmitting to the receiver device, from the medical device via a third communication channel different from the first communication channel, a second identifier associated with the medical device. The method may additionally include receiving from the medical device, at the receiver device via the third communication channel, the second identifier associated with the medical device. The method may also further include transmitting, to the control device, from the receiver device via a second communication channel different from the first communication channel and the third communication channel, the second identifier associated with the medical device. The method may also include additionally determining, at the control device, that the first identifier received over the first communication channel matches the second identifier received over the second communication channel. The method may further include automatically pairing the control device with the medical device associated with the matching identifiers over the first communication channel.

In such still a further aspect, according to some aspects, may include transmitting control inputs from control device to the medical device associated with the matching identifier, the control inputs for controlling a function of the medical device. In other such aspects the optical communication channel may be an infrared (IR) communication channel and the wireless communication channels may be radio frequency (RF) communication channels. Still other such aspects may include automatically disassociating the control device from the medical device based on the first identifier no longer being detected over the first communication channel or the second identifier no longer being detected over the first communication channel. Additional such aspects may include updating the visual indicator to reflect that the medical device is not within a line-of-sight of the receiver device.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
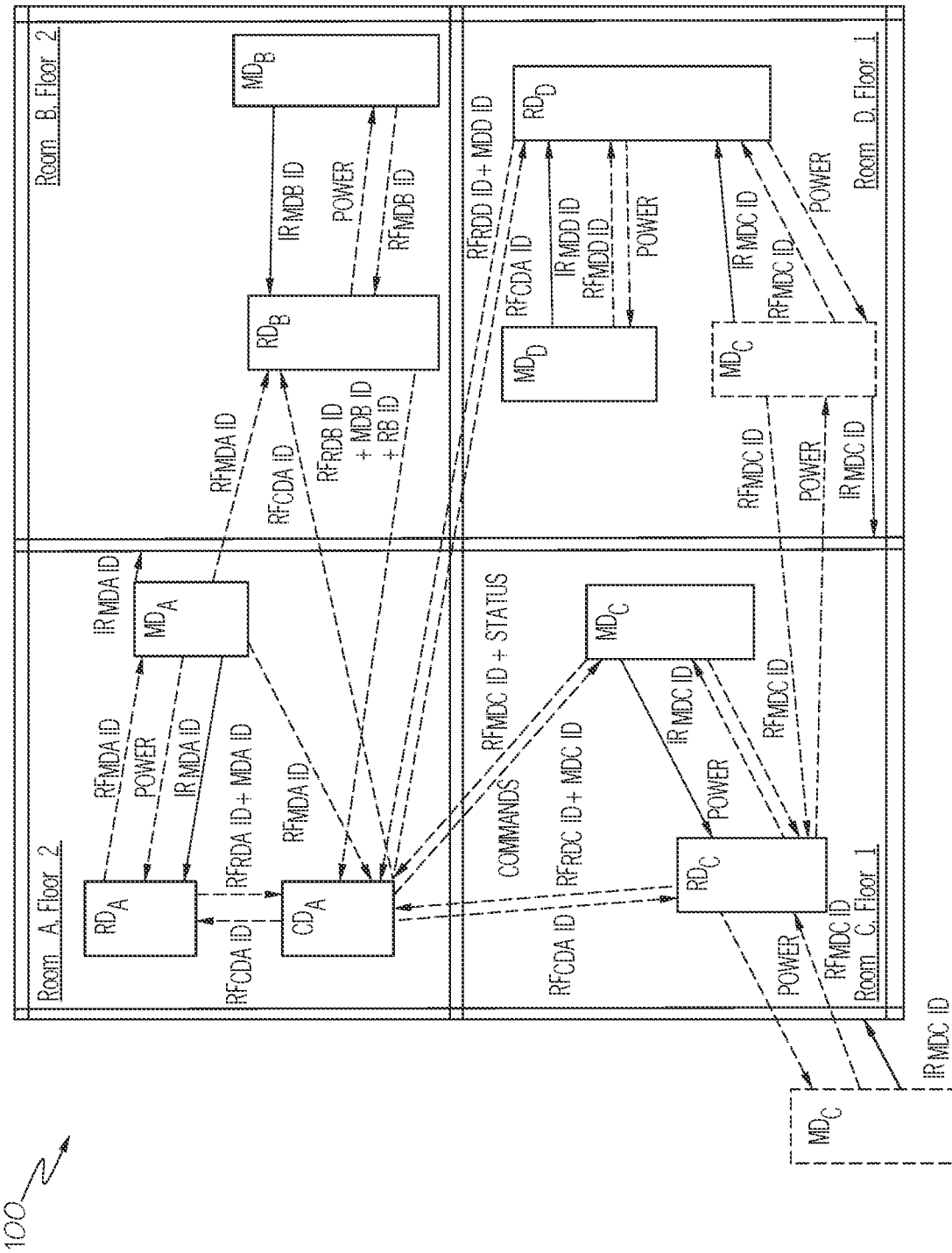
FIG. 1 depicts a block diagram illustrating a control device in wireless communication with a plurality of medical devices and a plurality of receiver devices distributed amongst a plurality of rooms and a plurality of floors of a medical facility, according to one or more embodiments shown and described herein.

Reference will now be made in detail to embodiments to pair a medical device and a control device via a receiver device to identify the medical device using a line-of-sight optical link, wireless radio frequency, and/or camera(s), examples of which are illustrated in the accompanying drawings. Whenever possible, the same reference numerals will be used throughout the drawings to refer to the same or like parts. Various embodiments of the present disclosure are depicted in FIG. 1. In general, a medical facility 100 may include a plurality of rooms and/or a plurality of floors (e.g., Rooms A and B on Floor 2 and Rooms C and D on Floor 1). In such aspects, one or more medical devices (e.g. $MD_A$, $MD_B$, $MD_C$, and/or $MD_D$), one or more control devices $CD_A$, and one or more receiver devices (e.g., $RD_A$, $RD_B$, $RD_C$, and/or $RD_D$) may be distributed amongst the rooms, floors (see FIG. 1), and/or within sub-spaces within a given room (e.g., a large triage room with multiple beds, hospital rooms that are shared by 2 or more patients, etc.).

In one aspect, referring to FIG. 1, a receiver device (e.g., $RD_A$) and a medical device (e.g., $MD_A$) may be fixedly positioned within a room (e.g., Room A) and located in line-of-sight of one another. Line-of-sight, for example, may refer to an arrangement such that an optical system (e.g., IR system) of a medical device has an unobstructed view of an optical system (e.g., IR system) of a receiver device (RD) for emitted radiation (e.g., IR) to travel therebetween along a straight line or path. Line-of-sight may alternatively refer to an arrangement such that a visual system (e.g., camera system) of a receiver device (RD) has an unobstructed view of a visual identifier (QR code, bar code, April tag, ArUco marker, and the like) of a medical device (MD) for visual light to travel therebetween along a straight line or path. According to the optical system aspect, the control device (e.g., $CD_A$) may be wirelessly paired (e.g., via a Bluetooth RF signal) with the receiver device (e.g., $RD_A$), wherein such pairing may be permanent in some aspects and/or the receiver device is permanently located within a room. In some aspects, medical devices ($MD_A$, $MD_B$, $MD_C$, $MD_D$, and/or the like) may wirelessly transmit (e.g., via a Bluetooth RF signal and/or radio frequency identification (RFID)) their identifiers ($MD_A$ ID, $MD_B$ ID, $MD_C$ ID, $MD_D$ ID, and/or the like) to receiver devices and/or control devices. Since a wireless signal may penetrate the walls and/or floors of the medical facility 100, a number of receiver devices ($RD_A$, $RD_B$, $RD_C$, $RD_D$, and/or the like) and/or control devices (e.g., $CD_A$, and/or the like) within range (e.g., up to 300 feet for Class 1 Bluetooth, up to 33 feet for Class 2 Bluetooth, and/or the like) may wirelessly receive the medical device identifiers ($MD_A$, $MD_B$, $MD_C$, $MD_D$, and/or the like). For example, a receiver device may emit a low power signal to elicit a response from a tag located on the medical device, such as a passive radio frequency identification (RFID) tag. Once the passive RFID tag on the medical device receives transmitted power from the receiver device, the RFID tag may then wirelessly transmit data (such as a medical device identifier MD ID) back to the receiver device. In this aspect, the receiver device may be located near the floor level of a room, although other suitable locations/heights may be utilized in other aspects. In some aspects, where the medical device is a bed that utilizes an optical system, the IR transmitter may be located at the head of the bed, although other suitable locations on the medical device may be utilized in other aspects. Continuing with the aspect, when a medical device such as a bed is rolled into a room and parked in a bay, the receiver device would almost always be in direct line-of-sight with the IR transmitter of the medical device (e.g., the bed). Thus, if wireless links are pairable, discoverable, and/or user-configurable, the systems and/or methods described herein may be used to ensure that a particular controlling device is paired to a particular medical device to prevent the unintended activation and/or control of a similar or identical medical device (e.g., located in another room or in another sub-space within a given room) despite that similar or identical medical device's wireless link being accessible to the particular controlling device (e.g., through walls or within a subdivided room).

Further in such an aspect, a medical device (e.g., $MD_A$) may optically transmit (e.g., via an IR optical signal) its identifier (e.g., $MD_A$ ID) to a receiver device (e.g., $RD_A$) within its line-of-sight. In another aspect, a receiver device (e.g., $RD_A$) may visually detect/scan (such as via a camera) a visual identifier on the medical device ($MD_A$) to obtain the medical device identifier (e.g., $MD_A$ ID). Since neither an optical signal nor visual light can penetrate the walls and/or the floors of the medical facility 100, the medical device is only able to optically transmit and/or make visually available its identifier (e.g., $MD_A$ ID) to receiver devices within its room (e.g., $RD_A$ in Room A). Yet further in such an aspect, each control device (e.g., $CD_A$) optically receiving a medical device identifier (e.g., $MD_A$ ID) via its wireless communication channel (e.g., IR channel) from the receiver device (e.g., $RD_A$) may be configured to scan its wireless communication channel (e.g., RF channel) to determine whether the medical device identifier (e.g., $MD_A$ ID) received via its wireless communication channel (e.g., IR channel) from the receiver devices matches a medical device identifier wirelessly received via its wireless communication channel (e.g., RF channel) from a medical device (e.g., $MD_A$). If a match exists, the control device (e.g., $CD_A$) may be configured to automatically identify/authenticate the medical device (e.g., $MD_A$) corresponding to the matching identifier (e.g., $MD_A$ ID) and to pair with the identified medical device (e.g., $MD_A$). As used in herein, authentication between devices may refer to verification of ID numbers or any other suitable mechanism to verify or otherwise identify the identity of a particular device. After such an authenticated pairing (e.g., one-way identification), each identified medical device (e.g., $MD_A$) may be configured to receive control signals from the control device (e.g., $CD_A$) over its wireless communication channel (e.g., RF channel). In some aspects, after such an identified pairing (e.g., one-way authentication), each identified medical device (e.g., $MD_A$) may be configured to receive control signals from the control device (e.g., $CD_A$) over its wireless communication channel (e.g., RF channel). Still referring to FIG. 1, medical devices (e.g., $MD_B$, $MD_C$, $MD_D$, and/or the like) that are not within a line-of-sight of a receiver device (e.g., $RD_A$) cannot optically transmit and/or make visually available their identifiers (e.g., $MD_B$ ID, $MD_C$ ID, $MD_D$ ID) to the receiver device in Room A (e.g., $RD_A$) and thus the control device ($CD_A$) will not be triggered to scan its respective wireless communication channels for a medical device identifier ($MD_A$ ID) provided by a medical device ($MD_A$) matching a medical device identifier ($MD_A$ ID) provided by a receiver device ($RD_A$).

In another aspect, referring to FIG. 1, a medical device (e.g., $MD_A$) and a receiver device (e.g., $RD_A$) may be fixedly positioned within a room (e.g., Room A) and in line-of-sight of one another. According to such an aspect, the medical device (e.g., $MD_A$) may wirelessly transmit (e.g., via RFID) its identifier (e.g., $MD_A$ ID) after receiving power from the receiver device (e.g., $RD_A$). Again, since a wireless signal may penetrate the walls and/or floors of the medical facility 100, a number of medical devices, control devices ($CD_A$), and/or a number of receiver devices (e.g., $RD_B$, and/or the like) within range may wirelessly receive the identifier (e.g., $MD_A$ ID). Further in such an aspect, the medical device (e.g., $MD_A$) may optically transmit (e.g., via an IR optical signal) and/or make visually available its identifier (e.g., $MD_A$ ID) to receiver devices (e.g., $RD_A$) within its line-of-sight. Again, since an optical signal cannot penetrate the walls and/or the floors of the medical facility 100, the medical device (e.g., $MD_A$) is only able to optically transmit and/or make visually available its identifier (e.g., $MD_A$ ID) to receiver devices within its room (e.g., $RD_A$ in Room A). Yet further in such an aspect, each control device (e.g., $CD_A$) wirelessly receiving a medical device identifier (e.g., $MD_A$ ID) via its wireless communication channel (e.g., RF channel) from a receiver device ($RD_A$) may be configured to scan its wireless communication channel (e.g., RF channel) to determine whether the medical device identifier (e.g., $MD_A$ ID) wirelessly received via its wireless communication channel (e.g., IR channel) from the receiver device ($RD_A$) matches a medical device identifier wirelessly also received via its wireless communication channel (e.g., RF channel) from a medical device ($MD_A$). If a match exists, the control device (e.g., $CD_A$) may be configured to automatically authenticate the medical device (e.g., $MD_A$) corresponding to the matching identifier (e.g., $MD_A$ ID) and to pair with the authenticated medical device (e.g., $MD_A$). After such an authenticated pairing, each control device (e.g., $CD_A$) may be configured to transmit control signals to the identified medical device (e.g., $MD_A$) over its wireless communication channel (e.g., RF channel).

In another aspect, still referring to FIG. 1, a receiver device (e.g., $RD_C$) and a medical device (e.g., $MD_C$) may not be fixedly positioned within a room (e.g., Room C) and may not be within line-of-sight of one another. According to such an aspect, the medical device (e.g., $MD_C$) positioned outside of the room (e.g., Room C) may wirelessly transmit (e.g., via passive RFID signal) its identifier (e.g., $MD_C$ ID) such that a receiver device (e.g., $RD_C$) not within line-of-sight of any other receiver device (e.g., $RD_A$, $RD_B$, $RD_D$, and/or the like) and/or a control device ($CD_A$) may wirelessly receive the identifier (e.g., $MD_C$ ID). Similar to above, the control device (e.g., $CD_A$) may optically transmit (e.g., via an IR optical signal) and/or make visually available its identifier (e.g., $CD_A$ ID). However, in view of FIG. 1, since the receiver device (e.g., $RD_C$) is not yet within a line-of-sight of the medical device (e.g., $MD_C$), the receiver device (e.g., $RD_C$) will not optically receive and/or make visually receive/scan the medical device identifier (e.g., $MD_C$ ID) and will not be triggered to send the medical device identifier (e.g., $MD_C$ ID) via its wireless communication channel to a control device ($CD_A$). However, after repositioning the medical device (e.g., $MD_C$) to be within the room (e.g., Room C) and within the line-of-sight of the receiver device (e.g., $RD_C$), the receiver device (e.g., $RD_C$) may optically/visually receive the medical device identifier (e.g., $MD_C$ ID) via its optical communication channel. The receiver device (e.g., $RD_C$), having previously been wirelessly paired with the control device ($CD_A$), may be triggered to send the medical device identifier (e.g., $MD_C$ ID) to the control device ($CD_A$). Having received the medical device identifier (e.g., $MD_C$ ID), the control device ($CD_A$) may scan its wireless communication channel for a matching medical device identifier as well as automatically authenticate and pair with the medical device (e.g., $MD_C$) associated with a matching medical device identifier (e.g., $MD_C$ ID). The medical device (e.g., $MD_C$) may then be configured to receive control inputs/commands from the identified control device (e.g. $CD_C$) over its wireless communication channel. Yet further, in view of FIG. 1, the medical device (e.g., $MD_C$), after being paired with an identified control device (e.g., $CD_A$) may be repositioned within another room (e.g., Room D) without a line-of-sight to the receiver device (e.g., $RD_C$).

According to various aspects of the present disclosure, after being paired with an identified control device (e.g., $CD_A$), a receiver device (e.g., $RD_C$) may be further configured to monitor its optical communication channel for the identified medical device identifier (e.g., $MD_C$ ID). In such an aspect, if the medical device identifier (e.g., $MD_C$ ID) is no longer being received over the optical communication channel by the receiver device (e.g., $RD_C$), the control device (e.g., $CD_A$) may be configured to automatically disassociate from the medical device (e.g., $MD_C$) over the wireless communication channel, and/or vice versa. However, after repositioning the medical device (e.g., $MD_C$) within another room (e.g., Room D; or between sub-spaces within a given room) and within the line-of-sight of another receiver device (e.g., $RD_D$), the receiver device (e.g., $RD_D$) may optically/visually receive the medical device identifier (e.g., $MD_D$ ID) via its optical communication channel. In turn, the control device (here the same control device $CD_A$, although another control device may be utilized in inside/ outside the room or within a sub-partition of the room (e.g., Room A)) may be triggered to scan its wireless communication channel for a matching medical device identifier as well as automatically identify and pair with the medical device (e.g., $MD_D$) associated with a matching medical device identifier (e.g., $MD_D$ ID). The medical device (e.g., $MD_C$) may then be configured to receive control inputs from the newly paired control device over its wireless communication channel. In such various aspects, although not specifically described, it should be appreciated that control devices may alternatively authenticate/identify and pair with the medical device (e.g., $MD_C$) via one-way authentication or the medical device (e.g., $MD_C$) may authenticate and pair with the control devices and the control devices may authenticate and pair with the medical device (e.g., $MD_C$) via two-way authentication, either of which may utilize a receiver device to obtain a medical device ID and send it to a control device for comparison with any medical device IDs received by the control device. Furthermore, similar to as described herein, after being paired with an identified medical device (e.g., $MD_C$), control devices may be further configured to monitor their respective wireless (RF) communication channels for the authenticated/identified medical device identifier (e.g., $MD_C$ ID). In such an aspect, if the medical device identifier (e.g., $MD_C$ ID) is no longer being received over their respective wireless (RF) communication channels, the control devices may be configured to automatically disassociate from the medical device (e.g., $MD_C$) over their respective wireless communication channels.

In a further aspect, a receiver device (e.g., $RD_D$) and a medical device (e.g., $MD_D$) may not be fixedly positioned within a room (e.g., Room D). For example, referring to FIG. 1, although the medical device (e.g., $MD_D$) may be repositioned, it may remain positioned within the line-of-sight of the receiver device (e.g., $RD_D$). Accordingly, the control device (e.g., $CD_A$) and the ($MD_D$) may be authentically paired with one another as described herein (e.g., one-way authentication, two-way authentication). In this vein, as described herein, another medical device (e.g., $MD_C$) may be positioned within the line-of-sight of the receiver device (e.g., $RD_D$) in the room (e.g., Room D). Accordingly, the receiver device (e.g., $RD_D$) may optically/visually receive another medical device identifier (e.g., $MD_C$ ID) via its optical communication channel (e.g., IR channel). In such an aspect, the receiver device (e.g., $RD_D$) may be configured to monitor its optical communication channel for the identified medical device identifier (e.g., $MD_D$ ID). In one example, if the identified medical device identifier (e.g., $MD_D$ ID) is still being received over its optical communication channel, the control device (e.g., $CD_A$) may be configured to remain authentically paired to the medical device (e.g., $MD_D$) and ignore the presence of the other medical device (e.g., $MD_C$). In an alternative example, if the identified medical device identifier (e.g., $MD_D$ ID) is still being received over the optical communication channel of the receiver device (e.g., $RD_D$), the control device (e.g., $CD_A$) may be configured to further pair with the other medical device (e.g., $MD_C$).

In yet another aspect, a receiver device (e.g., $RD_B$) fixed within a room (e.g., Room B) may have an associated room identifier (e.g., RB ID). In such an aspect, each receiver device (e.g., $RD_B$) having a room identifier (e.g., RB ID) may be configured to wirelessly transmit the room identifier (e.g., RB ID) along with its own identifier (e.g., $RD_B$ ID) over its wireless communication channel (e.g., RF channel) to a control device (e.g., $CD_A$). Similarly, in some aspects, a medical device (e.g., $MD_B$) having a room identifier (e.g., RB ID) may be configured to wirelessly transmit the received room identifier (e.g., RB ID) with its identifier (e.g., $MD_B$ ID) over its wireless communication channel(s) (e.g., RF channel) to the control device (e.g., $CD_A$) and/or via RFID to the receiver device (e.g., $RD_B$) after receiving power from the receiver device (e.g., $RD_B$). In another aspect this may be transmitted to the receiver device (e.g., $RD_B$) via an optical communication channel (e.g., IR channel). In this vein, in one example, each control device (e.g., $CD_A$) that wirelessly receives a room identifier (e.g., RB ID) via its optical communication channel may be further configured to scan its wireless communication channel to determine whether the room identifier (e.g., RB ID) wirelessly received from the medical device (e.g., $MD_B$) via its optical communication channel matches a room identifier and/or a medical device identifier (e.g., MD ID) wirelessly received via its wireless communication channel from the receiver device (e.g., $RD_B$). If a match exists, each control device (e.g., $CD_B$) may be configured to automatically identify a medical device (e.g., $MD_B$) corresponding to the identifier (e.g., $MD_B$ ID) wirelessly received with the room identifier (e.g., RB ID) over its wireless communication channel and to pair with the identified medical device. After such a pairing (e.g., one-way identification), each control device (e.g., $CD_A$) may be configured to transmit control signals to the authenticated medical device (e.g., $MD_B$) over its wireless communication channel. In some aspects, after the control device (e.g., $CD_A$) pairs with the authenticated medical device (e.g., $MD_B$) and the medical device (e.g., $MD_B$) pairs to the identified control device (e.g., $CD_A$), the control device (e.g., $CD_A$) may transmit control signals to the medical device (e.g., $MD_B$) and the medical device (e.g., $MD_B$) receive control signals from the control device (e.g., $CD_A$). Additionally, the medical device (e.g., $MD_B$) may transmit status updates to the control device (e.g., $CD_A$) and the medical device (e.g., $MD_B$) may receive status updates from the control device (e.g., $CD_A$).

Figure 2A:
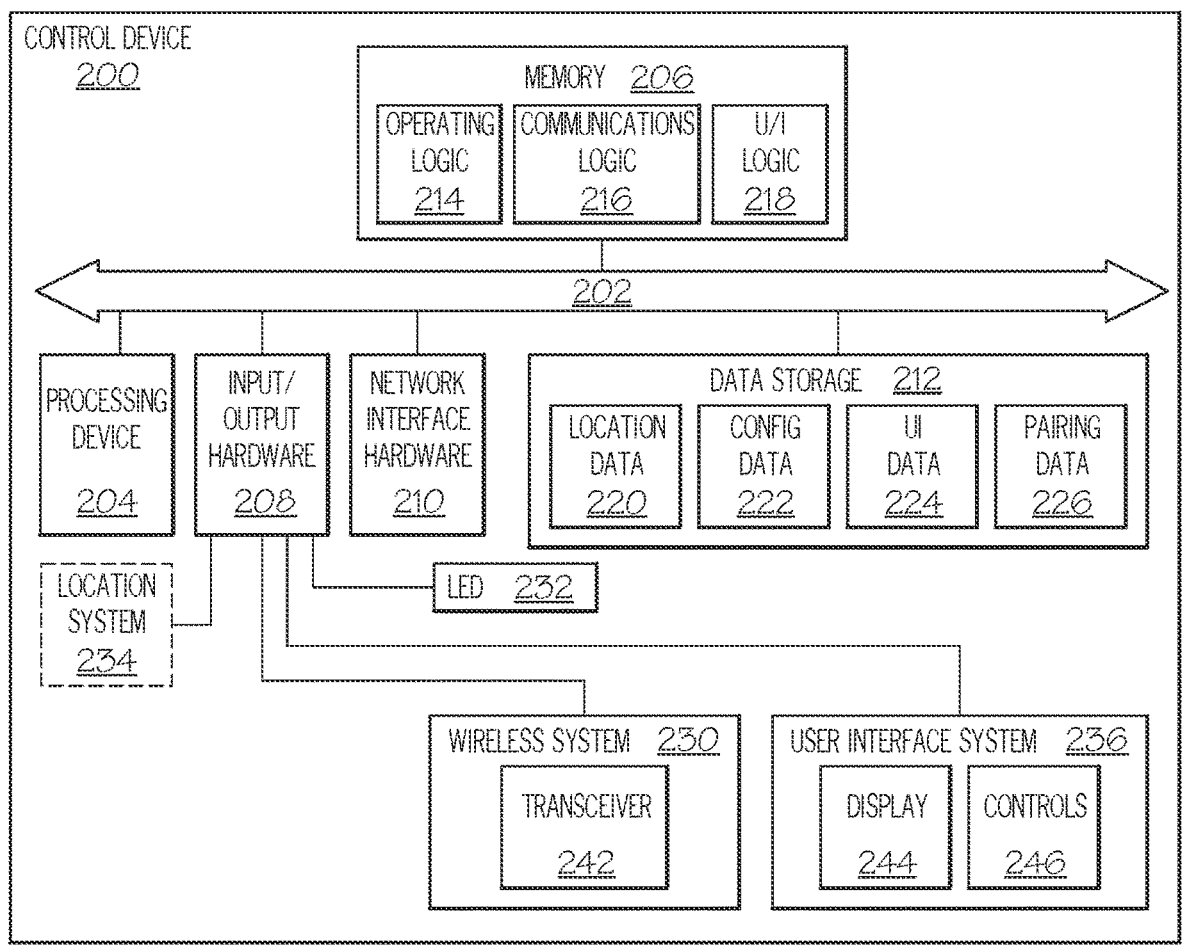
FIG. 2A depicts illustrative internal components of a control device that are communicatively coupled to one another to provide wireless link pairing with a receiver device and wireless control of a medical device, according to one or more embodiments shown and described herein.

FIG. 2A depicts illustrative internal components of a control device 200 that are communicatively coupled to one another to provide wireless link pairing with a receiver device and control of a medical device identified by the receiver device, according to one or more embodiments of the present disclosure. As shown in FIG. 2A, the control device 200 may include a local interface 202 (e.g., a bus) that communicatively interconnects the various components, including, but not limited to, a processing device 204, memory 206, input/output hardware 208, network interface hardware 210, and/or a data storage device 212.

The processing device 204, such as a computer processing unit (CPU), may be the central processing unit of the control device 200, performing calculations and logic operations required to execute a program. The processing device 204, alone or in conjunction with one or more of the other elements disclosed in FIG. 2A, is an illustrative processing device, computing device, processor, or combination thereof, as such terms are used in this disclosure.

The memory 206, such as read only memory (ROM) and random access memory (RAM), may constitute illustrative memory devices (i.e., non-transitory, processor-readable storage media). Such memory 206 may include one or more programming instructions thereon that, when executed by the processing device 204, cause the processing device 204 to complete various processes, such as the processes described herein. Optionally, the program instructions may be stored on a tangible computer-readable medium such as a digital disk, flash memory, a memory card, a USB drive, an optical disc storage medium (e.g., Blu-Ray™, CD, DVD), and/or other non-transitory processor-readable storage media.

In some embodiments, the program instructions contained on the memory 206 may be embodied as a plurality of software modules, where each module provides programming instructions for completing one or more tasks. For example, as shown in FIG. 2A, the memory 206 may contain one or more of operating logic 214, communications logic 216, and UI logic 218. It should be understood that the various logic modules described herein with respect to FIG. 2A are merely illustrative, and that other logic modules, including logic modules that combine the functionality of two or more of the modules described hereinabove, may be used without departing from the scope of the present disclosure.

Still referring to FIG. 2A, the data storage device 212, which may generally be a storage medium that is separate from the memory 206, may contain a data repository for storing electronic data and/or the like relating to the location of the control device 200, an identification of the control device 200, configuration settings, UI data, and/or the like. The data storage device 212 may be any physical storage medium, including, but not limited to, a hard disk drive (HDD), memory, removable storage, and/or the like. While the data storage device 212 is depicted as a local device, it should be understood that the data storage device 212 may be a remote storage device that is remotely located from the control device 200, such as, for example, a server computing device or the like.

Illustrative data that may be contained within the data storage device 212 may include, for example, location data 220, configuration data 222, UI data 224, pairing data 226, and/or the like. Pairing data 226 may include identification data (serial number, etc.) one or more medical device identifiers to which the control device 200 is or has been authentically paired through the receiver device via the methods as described herein.

The input/output hardware 208 may generally include a wireless system 230, an indicator 232, a location system 234, and a user interface system 236. The wireless system 230 may include a transceiver 242 configured to transmit and to receive wireless signals (e.g., RF, Bluetooth, UWB, and/or the like) according to the respective wireless protocols. According to various aspects, RF may be utilized to efficiently transfer data with fewer errors. In some aspects, data transmission techniques including encryption/decryption, forward error correction, and/or the like may be instituted. The indicator 232 may include a light emitting diode, indicator light, and/or the like. The location system 234 may include a Global Positioning System (GPS), a Global Navigation Satellite System (GLONASS), a Wi-Fi locating system, and/or the like. The user interface system may include a display 244 and/or user interface controls 246 configured to receive control inputs for transmission via the input/output hardware 208 and to display outputs received from the input/output hardware 208.

The network interface hardware 210 may generally provide the control device 200 with an ability to interface with one or more external devices, such as, for example, a medical facility server, a nurse station, and/or the like. Communication with external devices may occur using various communication ports (not shown). An illustrative communication port may be attached to a communications network, such as the Internet, an intranet, a local network, a direct connection, and/or the like.

It should be understood that in some embodiments, the input/output hardware 208 and the network interface hardware 210 may be combined into a single device that allows for communications with other devices, regardless of whether such other devices are located within the control device 200.

It should be understood that the components illustrated in FIG. 2A are merely illustrative and are not intended to limit the scope of the present disclosure. More specifically, while the components in FIG. 2A are illustrated as residing within the control device, this is a non-limiting example. In some embodiments, one or more of the components may reside external to the control device. Similarly, one or more of the components may be embodied in other devices not specifically described herein. Furthermore, various control devices are described herein (e.g., FIG. 3) and are non-limiting examples. Other control devices may include a user's personal cell-phone, a nurse's call system device, and/or the like with wireless communication channel capabilities.

Figure 2B:
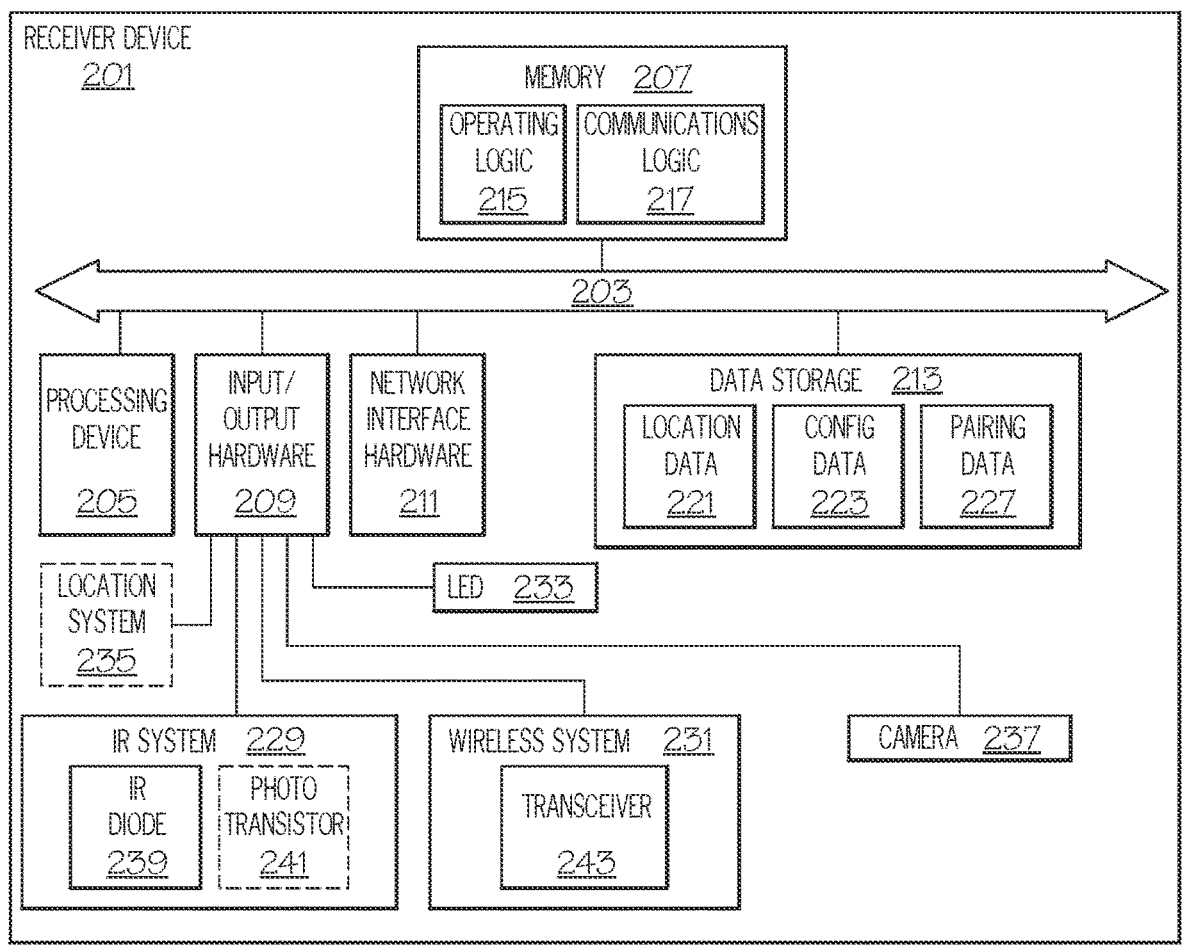
FIG. 2B depicts illustrative internal components of a receiver device that are communicatively coupled to one another to provide wireless, infrared, and/or optical identification of a medical device and wireless link pairing with a control device, according to one or more embodiments shown and described herein.

FIG. 2B depicts illustrative internal components of a receiver device 201 that are communicatively coupled to one another to provide identification of a medical device, according to one or more embodiments of the present disclosure. As shown in FIG. 2B, the receiver device 201 may include a local interface 203 (e.g., a bus) that communicatively interconnects the various components, including, but not limited to, a processing device 205, memory 207, input/output hardware 209, network interface hardware 211, and/or a data storage device 213.

The processing device 205, such as a CPU, may be the central processing unit of the receiver device 201, performing calculations and logic operations required to execute a program. The processing device 205, alone or in conjunction with one or more of the other elements disclosed in FIG. 2B, is an illustrative processing device, computing device, processor, or combination thereof, as such terms are used in this disclosure.

The memory 207, such as ROM and RAM, may constitute illustrative memory devices (i.e., non-transitory, processor-readable storage media). Such memory 207 may include one or more programming instructions thereon that, when executed by the processing device 205, cause the processing device 205 to complete various processes, such as the processes described herein. Optionally, the program instructions may be stored on a tangible computer-readable medium such as a digital disk, flash memory, a memory card, a USB drive, an optical disc storage medium (e.g., Blu-Ray™, CD, DVD), and/or other non-transitory processor-readable storage media.

In some embodiments, the program instructions contained on the memory 207 may be embodied as a plurality of software modules, where each module provides programming instructions for completing one or more tasks. For example, as shown in FIG. 2B, the memory 207 may contain one or more of operating logic 215, and communications logic 217. It should be understood that the various logic modules described herein with respect to FIG. 2B are merely illustrative, and that other logic modules, including logic modules that combine the functionality of two or more of the modules described hereinabove, may be used without departing from the scope of the present disclosure.

Still referring to FIG. 2B, the data storage device 213, which may generally be a storage medium that is separate from the memory 207, may contain a data repository for storing electronic data and/or the like relating to the location of the receiver device 201, an identification of the receiver device 201, configuration settings, UI data, and/or the like. The data storage device 213 may be any physical storage medium, including, but not limited to, a HDD, memory, removable storage, and/or the like. While the data storage device 213 is depicted as a local device, it should be understood that the data storage device 213 may be a remote storage device that is remotely located from the receiver device 201, such as, for example, a server computing device or the like.

Illustrative data that may be contained within the data storage device 213 may include, for example, location data 221, configuration data 223, pairing data 227, and/or the like. Pairing data 227 may include one or more medical device identifiers which the receiver device 201 has identified, along with pairing data relating a control device 200 to which the receiver device is paired via the methods as described herein.

The input/output hardware 209 may generally include an IR system 229, a wireless system 231, an indicator 233, a location system 235, and a user interface system 237. The IR system 229 may include an IR diode 239 (e.g., infrared LED) configured to emit/transmit infrared light and a photo transistor 241 configured to receive infrared light and to convert the infrared light into an electric current (e.g., according to IR protocols). The IR system 229 may be unidirectional (e.g., photo transistor 241 shown in phantom as optional) or bidirectional (e.g., including the photo transistor 241). Furthermore, the photo transistor 241 may be omni-directional to receive misaligned (e.g., within a defined tolerance) and/or reflected (e.g., off a wall, an object within the room, and/or the like) optical signals. According to various aspects the IR system 229 may include a transceiver module. The wireless system 231 may include a transceiver 243 configured to transmit and to receive wireless signals (e.g., RFID, RF, Bluetooth, UWB, and/or the like) according to the respective wireless protocols. According to various aspects, RF may be utilized to efficiently transfer data with fewer errors. In some aspects, data transmission techniques including encryption/decryption, forward error correction, and/or the like may be instituted. The indicator 233 may include a light emitting diode, indicator light, and/or the like. The location system 235 may include a GPS, a GLONASS, a Wi-Fi locating system, and/or the like.

The network interface hardware 211 may generally provide the receiver device 201 with an ability to interface with one or more external devices, such as, for example, a medical facility server, a nurse station, and/or the like. Communication with external devices may occur using various communication ports (not shown). An illustrative communication port may be attached to a communications network, such as the Internet, an intranet, a local network, a direct connection, and/or the like.

It should be understood that in some embodiments, the input/output hardware 209 and the network interface hardware 211 may be combined into a single device that allows for communications with other devices, regardless of whether such other devices are located within the receiver device 201.

It should be understood that the components illustrated in FIG. 2B are merely illustrative and are not intended to limit the scope of the present disclosure. More specifically, while the components in FIG. 2B are illustrated as residing within the control device, this is a non-limiting example. In some embodiments, one or more of the components may reside external to the control device. Similarly, one or more of the components may be embodied in other devices not specifically described herein.

Figure 2C:
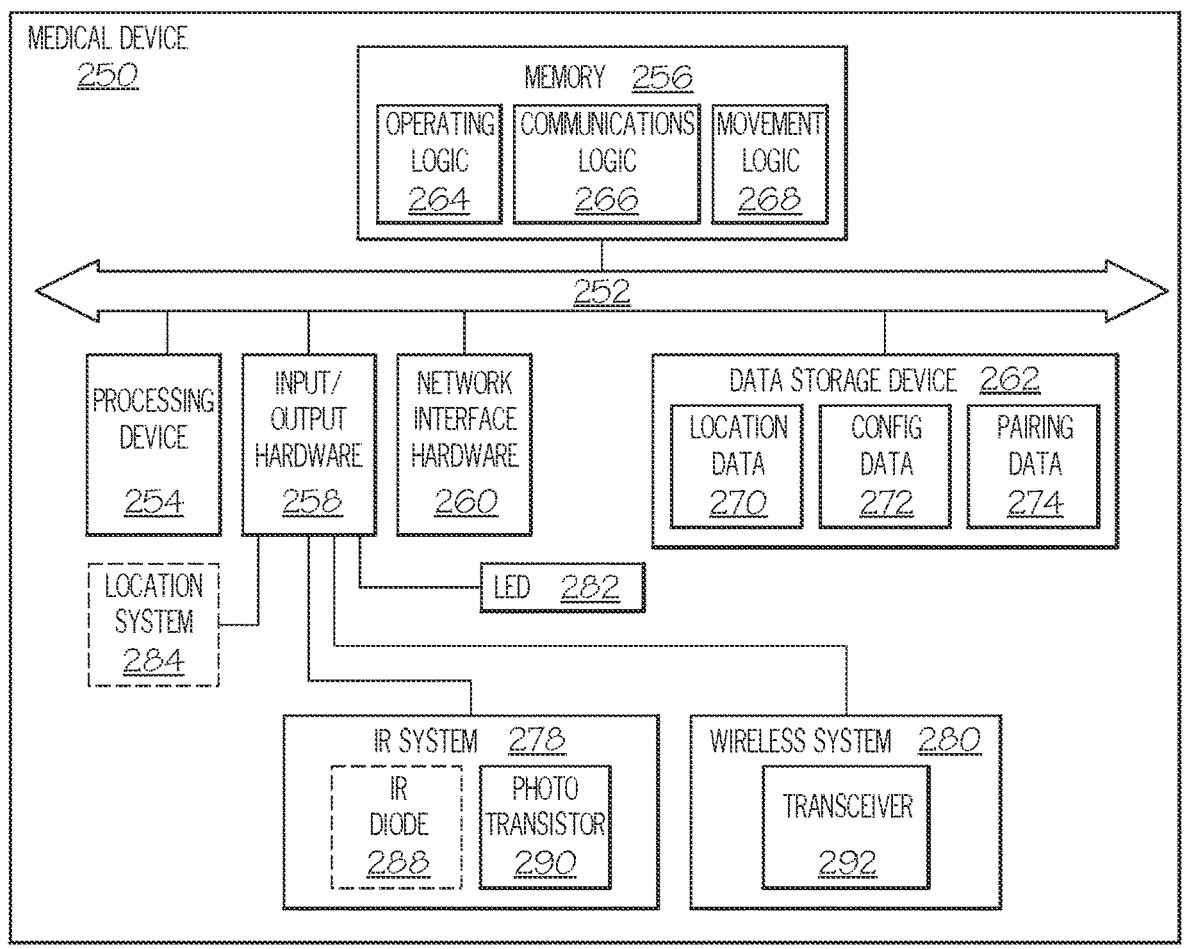
FIG. 2C depicts illustrative internal components of a medical device that are communicatively coupled to one another, provide identification to a receiver device, and receive wireless control from a control device, according to one or more embodiments shown and described herein.

FIG. 2C depicts illustrative internal components of a medical device 250 that are communicatively coupled to one another to provide wireless link pairing authentication with a control device, according to one or more embodiments of the present disclosure. As shown in FIG. 2C, the medical device 250 may include a local interface 252 (e.g., a bus) that communicatively interconnects the various components, including, but not limited to, a processing device 254, memory 256, input/output hardware 258, network interface hardware 260, and/or a data storage device 262.

The processing device 254, such as a computer processing unit (CPU), may be the central processing unit of the medical device 250, performing calculations and logic operations required to execute a program. The processing device 254, alone or in conjunction with one or more of the other elements disclosed in FIG. 2C, is an illustrative processing device, computing device, processor, or combination thereof, as such terms are used in this disclosure.

The memory 256, such as read only memory (ROM) and random access memory (RAM), may constitute illustrative memory devices (i.e., non-transitory, processor-readable storage media). Such memory 256 may include one or more programming instructions thereon that, when executed by the processing device 254, cause the processing device 254 to complete various processes, such as the processes described herein. Optionally, the program instructions may be stored on a tangible computer-readable medium such as a digital disk, flash memory, a memory card, a USB drive, an optical disc storage medium (e.g., Blu-Ray™, CD, DVD), and/or other non-transitory processor-readable storage media.

In some embodiments, the program instructions contained on the memory 256 may be embodied as a plurality of software modules, where each module provides programming instructions for completing one or more tasks. For example, as shown in FIG. 2C, the memory 256 may contain one or more of operating logic 264, communications logic 266, and movement logic 268. It should be understood that the various logic modules described herein with respect to FIG. 2C are merely illustrative, and that other logic modules, including logic modules that combine the functionality of two or more of the modules described hereinabove, may be used without departing from the scope of the present disclosure.

Still referring to FIG. 2C, the data storage device 262, which may generally be a storage medium that is separate from the memory 256, may contain a data repository for storing electronic data and/or the like relating to the location of the medical device 250, an identification of the medical device 250, configuration settings, and/or the like. The data storage device 262 may be any physical storage medium, including, but not limited to, a hard disk drive (HDD), memory, removable storage, and/or the like. While the data storage device 262 is depicted as a local device, it should be understood that the data storage device 262 may be a remote storage device that is remotely located from the medical device 250, such as, for example, a server computing device or the like.

Illustrative data that may be contained within the data storage device 262 may include, for example, location data 270, configuration data 272, pairing data 274, and/or the like. Pairing data 274 may include one or more control device identifiers to which the medical device 250 is or has been authentically paired and/or receiver devices 201 with which the medical device 250 has communicated with via the methods as described herein.

The input/output hardware 258 may generally include an IR system 278, a wireless system 280, an indicator 282, and a location system 284. The IR system 278 may include an IR diode 288 (e.g., infrared LED) configured to emit/transmit infrared light and a photo transistor 290 configured to receive infrared light and to convert the infrared light into an electric current (e.g., according to IR protocols). The IR system 278 may be unidirectional (e.g., IR diode 288 shown in phantom as optional) or bidirectional (e.g., including the IR diode 288). Furthermore, the photo transistor 290 may be omni-directional to receive misaligned (e.g., within a defined tolerance) and/or reflected (e.g., off a wall, an object within the room, and/or the like) optical signals. According to various aspects the IR system 278 may include a transceiver module. The wireless system 280 may include a transceiver 292 configured to transmit and to receive wireless signals (e.g., RFID, RF, Bluetooth, UWB, and/or the like) according to the respective wireless protocols. According to various aspects, RF may be utilized to efficiently transfer data with fewer errors. In some aspects, data transmission techniques including encryption/decryption, forward error correction, and/or the like may be instituted. The indicator 282 may include a light emitting diode, indicator light, and/or the like. The location system 284 may include a Global Positioning System (GPS), a Global Navigation Satellite System (GLONASS), a Wi-Fi locating system, and/or the like.

The network interface hardware 260 may generally provide the medical device 250 with an ability to interface with one or more external components, such as, for example, a medical facility server, a nurse station, and/or the like. Communication with external devices may occur using various communication ports (not shown). An illustrative communication port may be attached to a communications network, such as the Internet, an intranet, a local network, a direct connection, and/or the like.

It should be understood that in some embodiments, the input/output hardware 258 and the network interface hardware 260 may be combined into a single device that allows for communications with other devices, regardless of whether such other devices are located within the medical device 250.

It should be understood that the components illustrated in FIG. 2C are merely illustrative and are not intended to limit the scope of this disclosure. More specifically, while the components in FIG. 2C are illustrated as residing within the medical device 250, this is a non-limiting example. In some embodiments, one or more of the components may reside external to the medical device 250. Similarly, one or more of the components may be embodied in other devices not specifically described herein.

Figure 3:
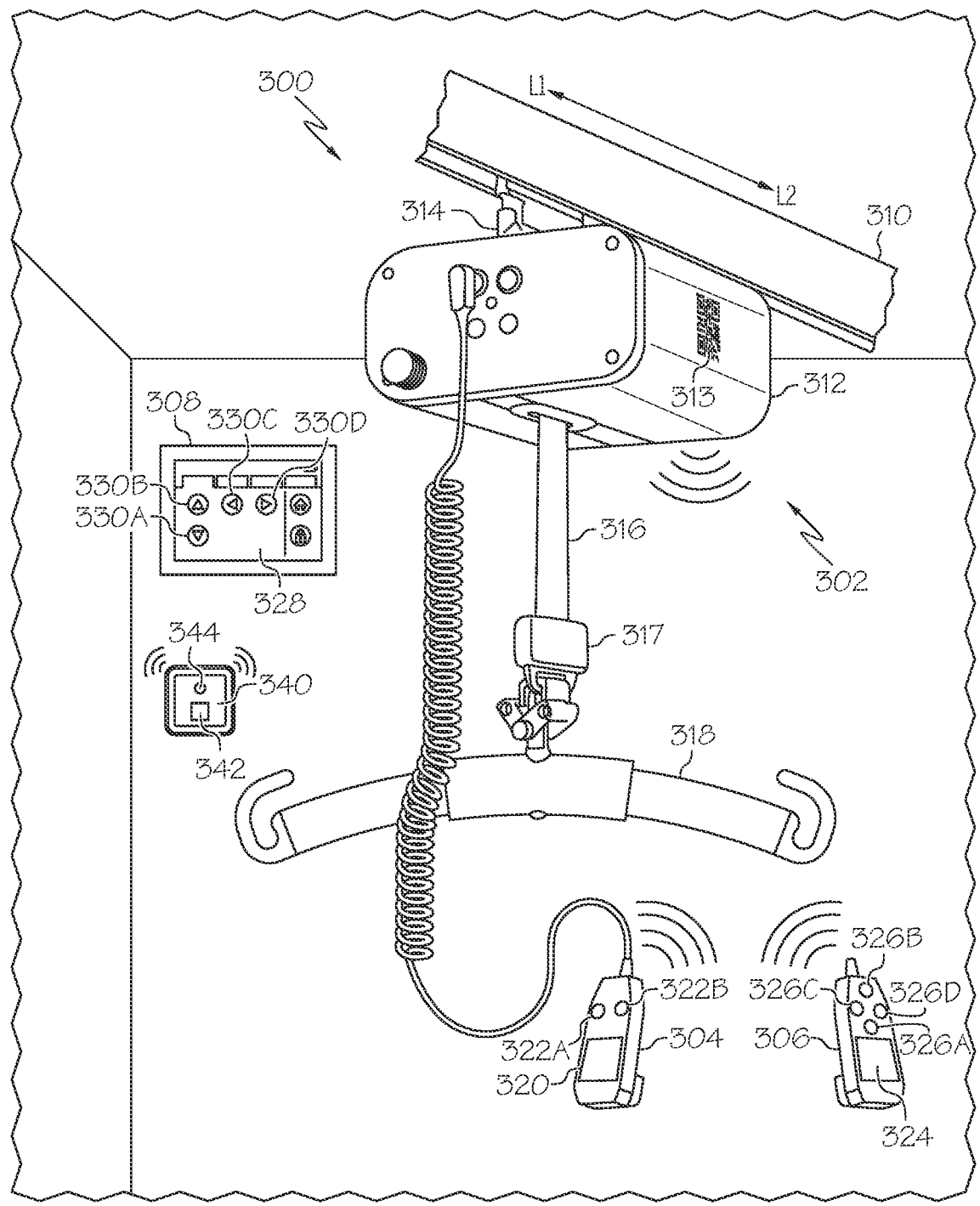
FIG. 3 depicts an illustrative wireless link pairing authentication system including a rail-mounted lift as a medical device, a receiver device, and a tethered hand control unit, a wireless hand control unit, and/or a wall-mounted control unit as control devices, according to one or more embodiments shown and described herein.

FIG. 3 depicts an illustrative wireless link pairing authentication system 300 including a rail-mounted lift 302 as an illustrative medical device, a receiver device 340, and a plurality of remote devices 304, 306, 308, as control devices, according to one or more embodiments of the present disclosure. Referring to FIG. 3, the rail-mounted lift 302 is coupled to a rail 310. According to various aspects, the rail 310 may extend along a ceiling of a room (e.g., Room A of FIG. 1), along a ceiling of more than one room (e.g., Room A and Room B of FIG. 1), and/or the like. More specifically, the rail-mounted lift 302 includes a lift unit 312 that is slidably coupled to the rail 310 via a carriage 314. The lift unit 312 may be used to support and/or lift a subject with a lifting strap 316 which is coupled to a motor (not shown) contained within the lift unit 312. The motor facilitates extending or retracting the lifting strap 316 from the lift unit 312, thereby raising and lowering a subject attached to the lifting strap 316. According to various embodiments, a subject may be attached to the lifting strap 316 with a sling bar 318 or a similar accessory attached to the lifting strap 316 via a coupling 317. The sling bar 318 or a similar accessory may be attached to a harness or a sling in which the subject is positioned, thereby facilitating the lifting operation.

Various control units, such as a tethered hand control unit 304, a wireless hand control unit 306, and/or a wall-mounted control unit 308, may be wirelessly (e.g., RF, Bluetooth, UWB, and/or the like) coupled to a receiver device 340. In one aspect, such a wireless coupling may be permanent based upon the receiver device 340 remaining in a particular room, regardless of whether a control unit resides in the room or not. The receiver device 340, according to the methods described herein, may detect and identify a medical device (e.g., the rail-mounted lift 302). In one aspect, the receiver device 340 may utilize an infrared sensor 342 to detect an infrared signal periodically emitted by the rail-mounted lift 302. In another aspect, the receiver device 340 may utilize a camera 344 to visually scan or otherwise visually detect a visual identifier displayed on the rail-mounted lift 302. In yet another aspect, the receiver device 340 may wirelessly detect a wireless signal emitted by the rail-mounted lift 302. Once a receiver device 340 has identified the rail-mounted lift 302, various components of the rail-mounted lift 302, such as the lift unit 312 and/or components thereof, may be operated with a control device such as a tethered hand control unit 304, a wireless hand control unit 306, and/or a wall-mounted control unit 308 communicatively couplable to the lift unit 312.

In view of FIG. 3, the tethered hand control unit 304 may be directly wired to the lift unit 312 and/or wirelessly coupled or paired to the lift unit 312 (e.g., according to the methods described herein) to facilitate remote operation of the rail-mounted lift 302. According to various aspects, the tethered hand control unit 304 may include a display 320 and one or more user interface controls 322A (e.g., to extend lifting strap 316), 322B (e.g., to retract the lifting strap 316). Similarly, the wireless hand control unit 306 may be wirelessly coupled or paired to the lift unit 312 (e.g., according to the methods described herein) and may include a display 324 and one or more user interface controls 326A (e.g., to extend lifting strap 316), 326B (e.g., to retract lifting strap), 326C (e.g., to translate lift unit 312 in a first lateral direction L1 along rail 310), 326D (e.g., to translate lift unit 312 in a second lateral direction L2 along rail 310), and the wall-mounted control unit 308 may be wirelessly coupled or paired to the lift unit 312 (e.g., according to the methods described herein) and may include a display 328 and one or more user interface controls 330A (e.g., to extend lifting strap 316), 330B (e.g., to retract lifting strap 316), 330C (e.g., to translate lift unit 312 in a first lateral direction L1 along rail 310), 330D (e.g., to translate lift unit 312 in a second lateral direction L2 along rail 310). Further user interface controls of the wall-mounted control unit 308 may activate the lift unit 312, pair a subject with the lift unit 312, return the lift unit 312 to a "home" position/location, receive information from the lift unit 312 (e.g., battery status, magnitude of load supported by the lift unit, and/or the like), actuate an emergency stop of the lift unit 312, reset the lift unit 312, and/or the like.

Figure 4A:
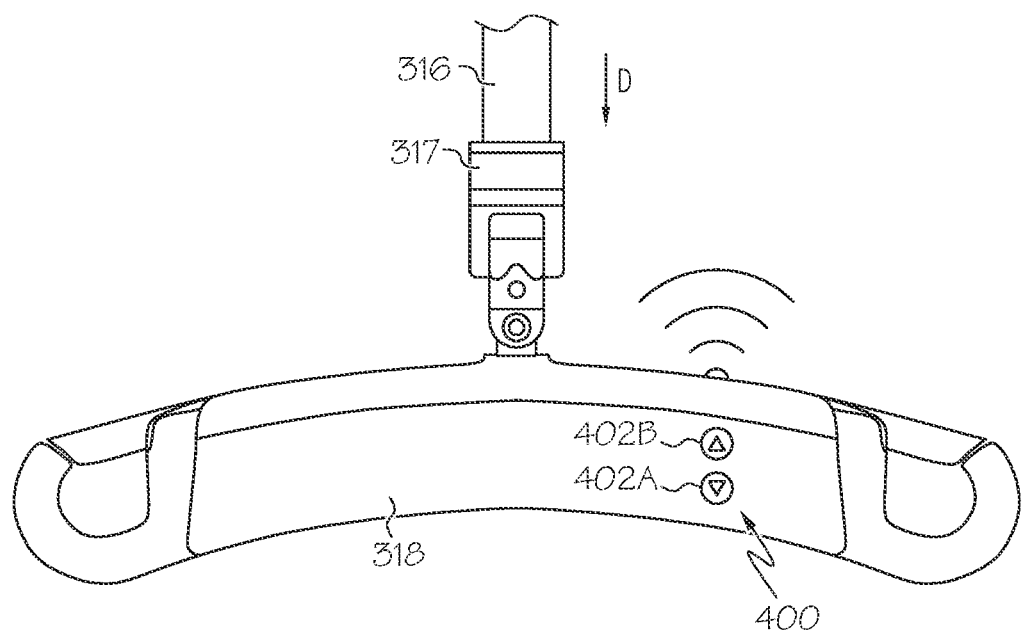
FIG. 4A depicts an illustrative sling bar control unit as a control device, according to one or more embodiments shown and described herein.
Figure 4B:
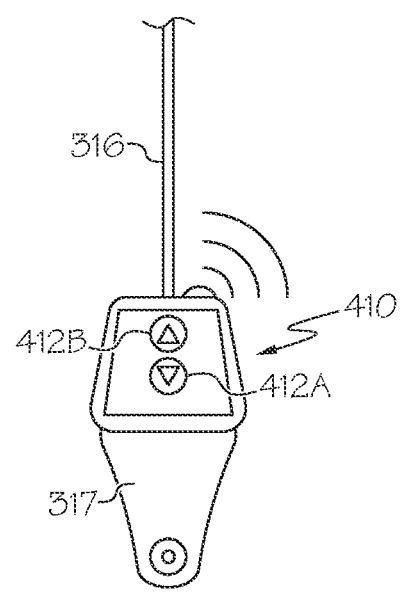
FIG. 4B depicts an illustrative coupling control unit as a control device, according to one or more embodiments shown and described herein.

Referring to FIGS. 4A and 4B, according to further aspects of the present disclosure, the rail-mounted lift 302

(e.g., FIG. 3) may be operated with a sling bar control unit 400 positioned on the sling bar 318 and/or a coupling control unit 410 positioned on the coupling 317 attached to a distal "D" end of the lifting strap 316. The sling bar control unit 400 may be identified by the receiver device 340 (wirelessly, infrared, and/or visually) and wirelessly coupled or paired to the lift unit 312 (e.g., according to the methods described herein) and may include one or more user interface controls 402A (e.g., to extend lifting strap 316), 402B (e.g., to retract lifting strap 316). Similarly, the coupling control unit 410 may be identified by the receiver device 340 (wirelessly, infrared, and/or visually) and wirelessly coupled or paired to the lift unit 312 (e.g., according to the methods described herein) and may include one or more user interface controls 412A (e.g., to extend lifting strap 316), 412B (e.g., to retract lifting strap 316).

In light of FIGS. 3, 4A and 4B, a plurality of control devices (e.g., a tethered hand control unit 304, a wireless hand control unit 306, a wall-mounted control unit 308, a sling bar control unit 400, a coupling control unit 410, and/or the like) may be either already physically present in a room, physically brought into the room, and/or physically taken out of the room.

According to some aspects of the present disclosure, a medical device (e.g., the rail-mounted lift 302) may allow movement within a room. In such aspects, referring to FIGS. 3 and 4B, control devices that physically remain in that room (e.g., wall-mounted control unit 308) and physically remain coupled to the medical device itself in that room (e.g., tethered hand control unit 304, coupling control unit 410), wherein a receiver device 340 remains in the line-of-sight to identify the medical device, and the control device may be configured to control the medical device identified by the receiver device 340. For example, the control device 200 (FIG. 2A) may store pairing data 226 (e.g., associated RD IDs and/or rail-mounted lift 302 MD IDs in a fixed pairings file) in its data storage device (212 FIG. 2A) for each medical device that physically remains in its room. Further in such aspects, referring to FIGS. 3 and 4A, one or more control devices may not physically remain in that room (e.g., wireless hand control unit 306, sling bar control unit 400). In such aspects, the control device may be configured to not only be identified and paired with such medical devices as they are brought into a room, but also to periodically or continually monitor pairings with such medical devices in coordination with identification of the medical device by a receiver device in the room. Periodically, as described herein, may refer to a regularly occurring interval or time period (e.g., every "X" seconds, every "Y" minutes, and/or the like).

Continuing the example, the control device may store pairing data (e.g., 226 FIG. 2A, e.g., associated MD IDs and/or RD IDs in a transient pairings file), in its data storage device (212 FIG. 2A) for each medical device (e.g., the rail-mounted lift 302) that may not physically remain in its room and the receiver device may periodically determine whether each authenticated receiver device identifier and/or control device identifier (e.g., RD ID and/or CD ID) is still being received over its optical communication channel (or wireless channel or via visual detection in other aspects). According to various aspects, if an authenticated medical device identifier (e.g., stored in the transient pairings file) is still being optically/visually received by the receiver device 340, the medical device (e.g., rail-mounted lift) may remain authentically paired with that control device and if the authenticated control device identifier is not still being optically/visually received by the infrared sensor 342 and/or camera 344 of the receiver device 340, the control device may automatically disassociate from that medical device (e.g., medical device considered as physically taken out of the room).

Further in light of FIGS. 3, 4A, and 4B, a medical device fixedly positioned within a room may be configured to establish a hierarchy for accepting control inputs (e.g., received at or near the same time) from a plurality of authentically paired control devices. For example, the medical device may be configured to give priority to a control input received from a first grouping including control devices physically remaining in a room (e.g., a tethered hand control unit 304, a wall-mounted control unit 308, and/or a coupling control unit 410) over a control input received from a second grouping including control devices that may not physically remain in the room (e.g., a wireless hand control unit 306 and/or a sling bar control unit 400) and utilize a receiver device 340. Further in such an example, the medical device may be configured to give priority to a control input received from control devices within the first grouping (e.g., tethered hand control unit 304 over coupling control unit 410 over wall-mounted control unit 308, and/or the like) and/or control devices within the second grouping (e.g., sling bar control unit 400 over wireless hand control unit 306, and/or the like). Here, it should be appreciated that such described hierarchies are non-limiting examples and that other hierarchies may be established.

According to other aspects of the present disclosure, a medical device (e.g., a rail-mounted lift 302) may not be fixedly positioned within a room. For example, a lift unit may be moved along a rail 310 (FIG. 3) from one room (e.g., FIG. 1, Room A) to another room (e.g., FIG. 1, Room B) or between sub-spaces within a given room. In such aspects, referring to FIGS. 3 and 4B, control devices that physically remain coupled to the medical device itself (e.g., tethered hand control unit 304, coupling control unit 410), remain in the line-of-sight of the receiver device 340 and the medical device may be configured to authenticate and remain paired with all such control devices. For example, the rail-mounted lift 302 may store pairing data (274 FIG. 2C, e.g., associated RD IDs and/or CD IDs in a fixed pairings file), in its data storage device (262 FIG. 2C) for each control devices that physically remains coupled to the rail-mounted lift 302. Further in such aspects, referring to FIGS. 3 and 4A, one or more control devices may not be physically coupled to the medical device itself. This may include control devices that physically remain in a given room (e.g., wall-mounted control units 308) and/or control devices that may not physically remain in any given room (e.g., wireless hand control unit 306, sling bar control unit 400). In such aspects, the medical device may be configured to not only authenticate and pair with such control devices and a receiver device 340 in the room, but also periodically or continually monitor authenticated pairings with such control devices via the receiver device 340.

Continuing the example, the receiver device 340 may store pairing data (e.g., 274 FIG. 2C, e.g., associated MD IDs and/or CD IDs in a transient pairings file), in its data storage device (e.g., 213 FIG. 2B) for each medical device that physically remains in a given room and that may not physically remain in any given room and (in relation, for example, to the rail-mounted lift 302) may periodically determine whether each authenticated medical device identifier (e.g., MD ID) is still being received over its optical communication channel. According to various aspects, upon detecting movement, the receiver device 340 may be configured to continually monitor authenticated pairings with such medical devices. Accordingly, if an authenticated medical device identifier (e.g., MD ID of a medical device being used between rooms or among sub-spaces within a given room) is still being optically/visually received, the medical device (e.g., rail-mounted lift) may remain authentically paired with the control device(s) and if the authenticated medical device identifier is not still being optically/visually received, the control device may automatically disassociate from that medical device. Further in such an aspect, the receiver device 340 may be configured to authenticate and pair with new medical devices with control devices (e.g., wall-mounted control unit 308 in new room) as the medical device transitions between rooms (or between sub-spaces within a given room) based upon identification (IR, wireless, visual scan) by a receiver device 340 of the medical device arriving in the new room.

Further in light of FIGS. 3, 4A, and 4B, a medical device not fixedly positioned within a room may be configured to be part of a hierarchy for accepting control inputs (e.g., received at or near the same time) from a plurality of authentically paired control devices via a receiver device. For example, the medical device may be configured to give priority to a control input received from a first grouping including control devices that physically remain coupled to the medical device itself (e.g., a tethered hand control unit 304, a coupling control unit 410) over a control input received from a second grouping including control devices that physically remain in a given room (e.g., wall-mounted control units 308) and/or control devices that may not physically remain in any given room (e.g., wireless hand control unit 306, sling bar control unit 400). In another example, the first grouping may include a control device being used to move the medical device between rooms (e.g., wireless hand control unit 306) or between sub-spaces within a given room. Here, with respect to a rail-mounted lift 302, it may be desired to use a wireless hand control unit 306 over a tethered hand control unit 304 and/or a coupling control unit 410 to move the rail-mounted lift 302 between rooms or between sub-spaces within a given room. Further in such an example, the medical device may be configured to give priority to a control input received from control devices within the first grouping (e.g., tethered hand control unit 304 or wireless hand control unit 306 over coupling control unit 410, and/or the like) and/or control devices within the second grouping (e.g., wireless hand control unit 306 over sling bar control unit 400 over wall-mounted control unit 308, and/or the like). Here, it should be appreciated that such described hierarchies are non-limiting examples and that other hierarchies may be established.

Figure 5:
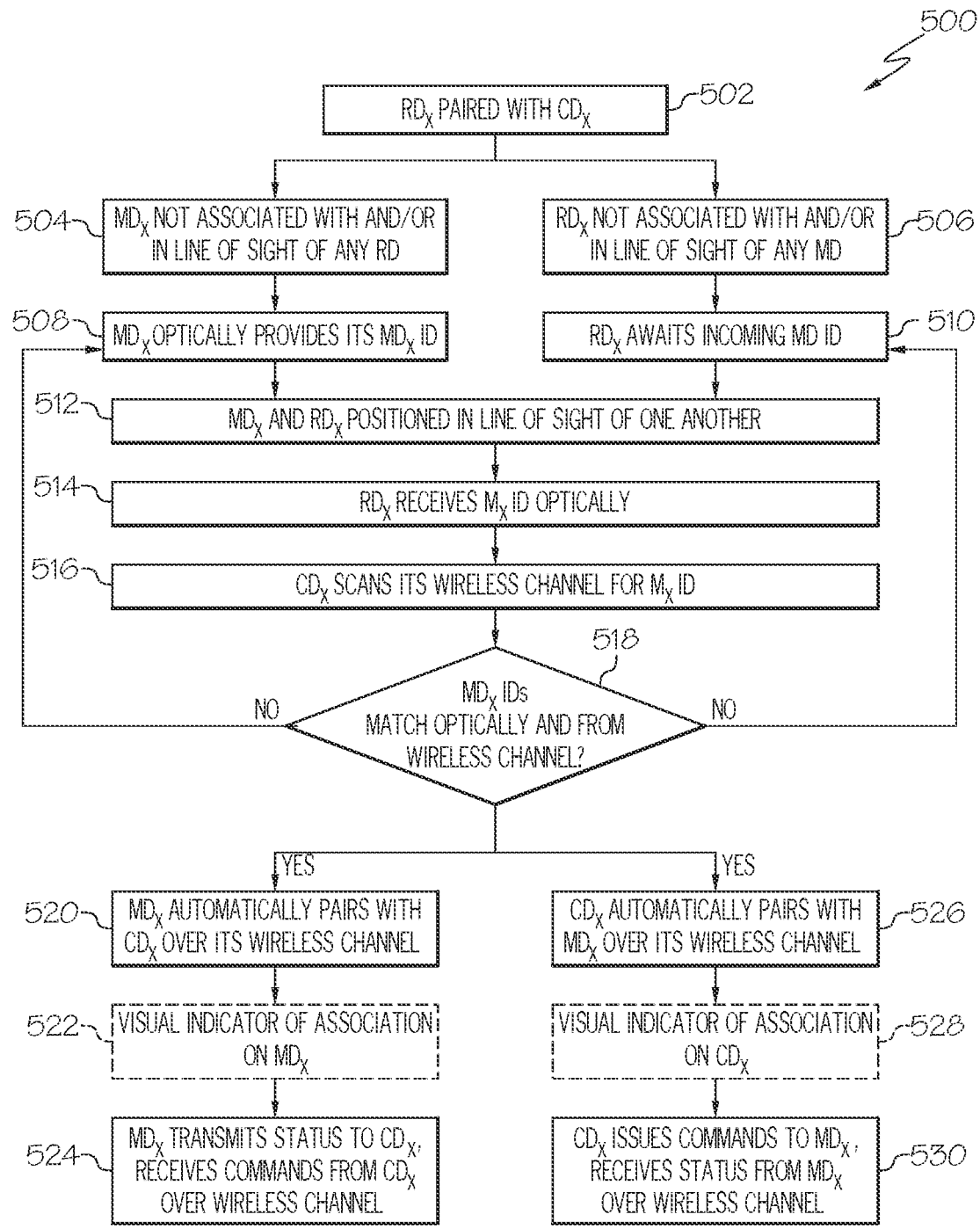
FIG. 5 depicts a flow diagram of an illustrative method for pairing a medical device and a control device via a receiver device using an optical channel, according to one or more embodiments shown and described herein.

FIG. 5 depicts a flow diagram of an illustrative method 500 for pairing a medical device and a control device via a receiver device using an optical communication channel, according to one or more embodiments of the present disclosure. Referring to FIG. 5, a medical device $MD_X$ may authenticate/identify and automatically pair with a control device. At block 502, a receiver device $RD_X$ may be paired with a control device $CD_X$. The receiving device $RD_X$ and control device $CD_X$ wireless may be paired via a wireless communication channel (e.g., RF channel), such that they may not be located in the same room. At block 504, a medical device $MD_X$ may not be associated with and/or in the line-of-sight of any receiver device $RD_X$. Concurrently, at block 506, a receiver device $RD_X$ may not be associated with and/or in the line-of-sight of any medical device (MD). Proceeding from block 504 to block 508, the medical device $MD_X$ may display its identifier $MD_X$ ID visually and/or periodically transmit it over its optical communication channel (e.g., IR channel). Periodically as described herein, may refer to a regularly occurring interval or time period (e.g., every "X" seconds, every "Y" minutes, and/or the like). According to further aspects, the medical device $MD_X$ may be configured to manually transmit its identifier $MD_X$ ID (e.g., upon a user actuating a transmit ID button on the medical device $MD_X$) over its optical communication channel (e.g., IR channel). Concurrently, at block 510 the receiver device $RD_X$ may await medical device identifiers (e.g., MD IDs) over its optical communication channel and/or visually via its camera. Referring still to FIG. 5, at block 512 the medical device $MD_X$ and a receiver device $RD_X$ may be positioned in a line-of-sight of one another. At block 514, the receiver device $RD_X$ may receive a medical device identifier $MD_X$ ID over its optical communication channel and/or via visual (camera) detection by the receiver device $RD_X$. At block 516, the control device $CD_X$ may scan its wireless communication channel for the medical device identifier $MD_X$ ID being sent from medical device $MD_X$ separately from what is being received by the receiver device $RD_X$. At decision block 518, the control device $CD_X$ may determine whether it is receiving the same medical device identifier $MD_X$ ID over its wireless communication channel from the receiver device $RD_X$ and the medical device $MD_X$. If there is no match between the medical device identifiers, then the flowchart returns to block 508 for the medical device $MD_X$ to again optically (or visually) provide its identifier $MD_X$ ID, with the receiver device $RD_X$ awaiting another medical device identifier MD ID concurrently at block 510.

Returning to decision block 518, if there is a match between the medical device identifiers received from the receiver device $RD_X$ and the medical device $MD_X$, then at block 520, the medical device $MD_X$ may automatically associate with the control device $CD_X$ over its wireless communication channel. According to various aspects, the medical device $MD_X$ may store the association as pairing data (e.g., 274 FIG. 2C) in its data storage device (e.g., 262 FIG. 2C). Concurrently, the control device $CD_X$ may authenticate and automatically pair with the medical device MD at block 526. A control device $CD_X$ may not be associated with and/or in the line-of-sight of any medical device. Proceeding from block 520, at block 522 (e.g., shown in phantom as optional), the medical device $MD_X$ may display a visual indicator of its association with a control device. According to some aspects, the visual indicator may be a light emitting diode (LED) (e.g., 282 FIG. 2C), which may illuminate when the medical device $MD_X$ is associated with a control device. According to another aspect, the visual indicator may flash and/or illuminate without flashes when the medical device $MD_X$ is associated with a control device over its wireless channel. According to yet further aspects, the visual indicator may include a display that indicates the control device(s) to which it is associated. Concurrently, at block 528 (e.g., shown in phantom as optional), the control device $CD_X$ may display a visual indicator of its association with a medical device. According to some aspects, the visual indicator may be a light emitting diode (LED) (282 FIG. 2C) that illuminates when the control device $CD_X$ is associated with a medical device. According to another aspect, the visual indicator may flash and/or illuminate without flashes when the control device $CD_X$ is associated with a medical device over its wireless channel. According to yet further aspects, the visual indicator may include a display that indicates the medical device(s) to which it is associated. Proceeding from block 522, at block 524, after being authentically paired with the control device $CD_X$, the medical device $MD_X$ may transmit status information to the control device $CD_X$ and/or receive control inputs or commands from the control device $CD_X$. Concurrently at block 530, after being authentically paired with the medical device $MD_X$, the control device $CD_X$ may transmit or issue control inputs or commands to the medical device $MD_X$ and/or receive status information from the medical device $MD_X$. According to various aspects of the present disclosure, the medical device $MD_X$ may not transmit status information to the control device $CD_X$ and/or receive control inputs or commands from the control device $CD_X$ and the control device $CD_X$ may not transmit or issue control inputs or commands to the medical device $MD_X$ and/or receive status information from the medical device $MD_X$ until such two-way authentication has occurred.

Figure 6:
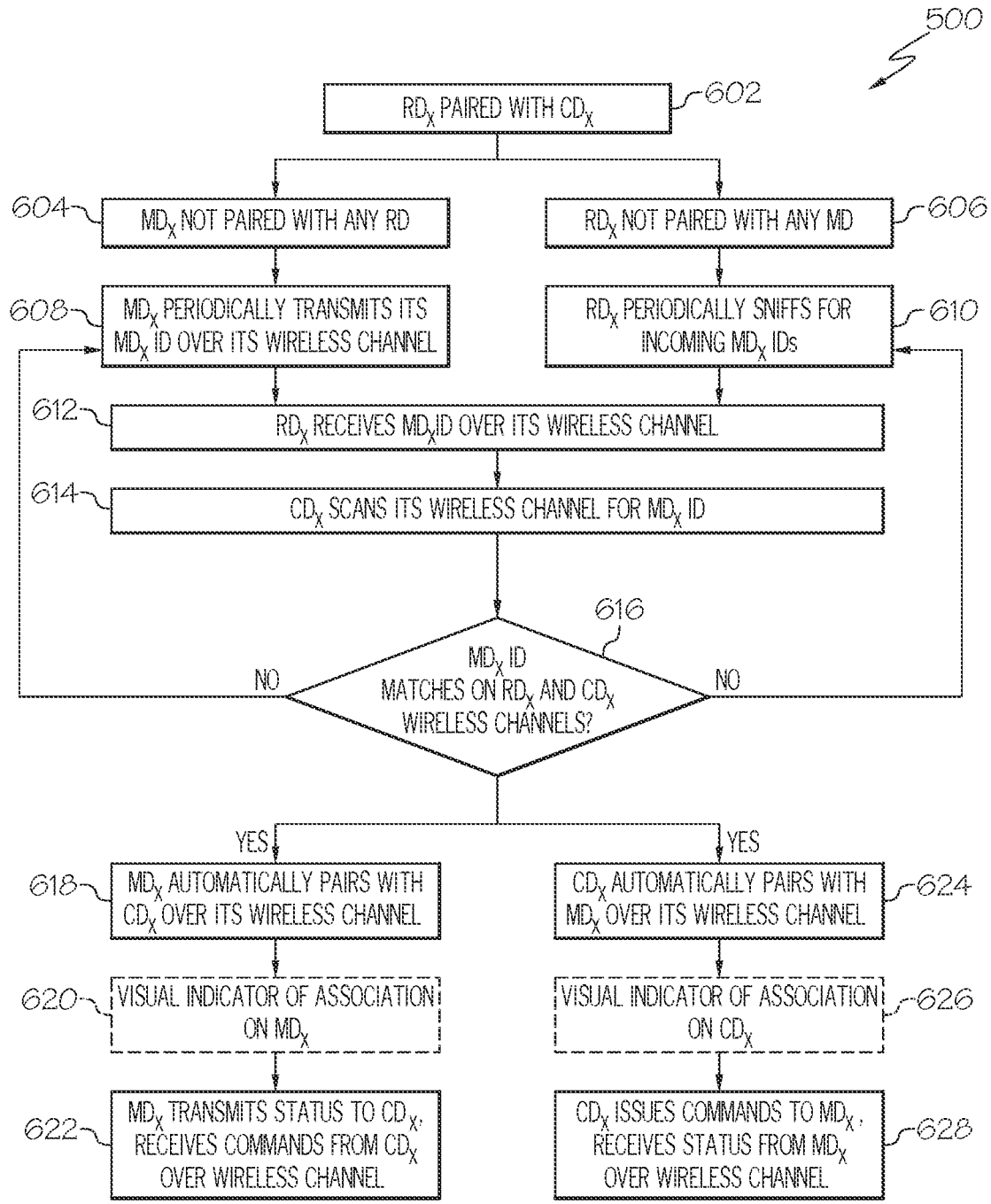
FIG. 6 depicts a flow diagram of another illustrative method for pairing a medical device and a control device via a receiver device using a wireless communication channel, according to one or more embodiments shown and described herein.

FIG. 6 depicts a flow diagram of an illustrative method 600 for pairing a medical device and a control device via a receiver device using a wireless communication channel, according to one or more embodiments of the present disclosure. Referring to FIG. 6, a medical device $MD_X$ may authenticate/identify and automatically pair with a control device. At block 602, a receiving device $RD_X$ may be paired with a control device $CD_X$. The receiving device $RD_X$ and control device $CD_X$ wireless may be paired via a wireless communication channel (e.g., RF channel), such that they may not be located in the same room. At block 604, a medical device $MD_X$ may not be paired or otherwise wirelessly associated with any receiver device RD. Concurrently, at block 606, a receiver device $RD_X$ may not be paired or otherwise wirelessly associated with any medical device (MD). Proceeding from block 604 to block 608, the medical device $MD_X$ may periodically transmit its identifier $MD_X$ ID over its wireless communication channel (e.g., RF channel). According to further aspects, the medical device $MD_X$ may be configured to manually transmit its identifier $MD_X$ ID (e.g., upon a user actuating a transmit ID button on the medical device ($MD_X$) over its wireless communication channel. Concurrently at block 610, the receiver device $RD_X$ may periodically sniff for RFID medical device identifiers (e.g., MD IDs) over its wireless communication channel after providing power to an RFID tag on the medical device ($MD_X$).

Referring still to FIG. 6, at block 614 the receiver device $RD_X$ may receive a medical device identifier $MD_X$ ID over its wireless communication channel, such as via RFID. At block 614, the control device $CD_X$ may scan its wireless communication channel for the medical device identifier $MD_X$ ID being sent from medical device $MD_X$ separately from what is being received by the receiver device $RD_X$. At decision block 616, the control device $CD_X$ may determine whether it is receiving the same medical device identifier $MD_X$ ID over its wireless communication channel from the receiver device $RD_X$ and the medical device $MD_X$. If there is no match between the medical device identifiers, then the flowchart returns to block 608 for the medical device $MD_X$ to wirelessly transmit its identifier $MD_X$ ID periodically, with the receiver device $RD_X$ periodically sniffing for other incoming medical device identifiers $MD_X$ ID over its wireless communication channel at block 610. Returning to decision block 616, if there is a match between the medical device identifiers received from the receiver device $RD_X$ and the medical device $MD_X$, then at block 618, the medical device $MD_X$ may automatically associate with the control device $CD_X$ over its wireless communication channel. According to various aspects, the medical device $MD_X$ may store the association as pairing data (e.g., 274 FIG. 2C) in its data storage device (e.g., 262 FIG. 2C). Concurrently, the control device $CD_X$ may authenticate and automatically pair with the medical device MD at block 624. A control device $CD_X$ may not be associated with and/or in the line-of-sight of any medical device. Proceeding from block 618 to block 620 (e.g., shown in phantom as optional), the medical device $MD_X$ may display a visual indicator of its association with a control device. According to some aspects, the visual indicator may be a light emitting diode (LED) (e.g., 282 FIG. 2C), which may illuminate when the medical device $MD_X$ is associated with a control device. According to another aspect, the visual indicator may flash and/or illuminate without flashes when the medical device $MD_X$ is associated with a control device over its wireless channel. According to yet further aspects, the visual indicator may include a display that indicates the control device(s) to which it is associated. Concurrently, at block 626 (e.g., shown in phantom as optional), the control device $CD_X$ may display a visual indicator of its association with a medical device. According to some aspects, the visual indicator may be a light emitting diode (LED) (282 FIG. 2C) that illuminates when the control device $CD_X$ is associated with a medical device. According to another aspect, the visual indicator may flash and/or illuminate without flashes when the control device $CD_X$ is associated with a medical device over its wireless channel. According to yet further aspects, the visual indicator may include a display that indicates the medical device(s) to which it is associated. Proceeding from block 620 to block 622, after being authentically paired with the control device $CD_X$, the medical device $MD_X$ may transmit status information to the control device $CD_X$ and/or receive control inputs or commands from the control device $CD_X$. Concurrently at block 628, after being authentically paired with the medical device $MD_X$, the control device $CD_X$ may transmit or issue control inputs or commands to the medical device $MD_X$ and/or receive status information from the medical device $MD_X$. According to various aspects of the present disclosure, the medical device $MD_X$ may not transmit status information to the control device $CD_X$ and/or receive control inputs or commands from the control device $CD_X$ and the control device $CD_X$ may not transmit or issue control inputs or commands to the medical device $MD_X$ and/or receive status information from the medical device $MD_X$ until such two-way authentication has occurred.

Figure 7:
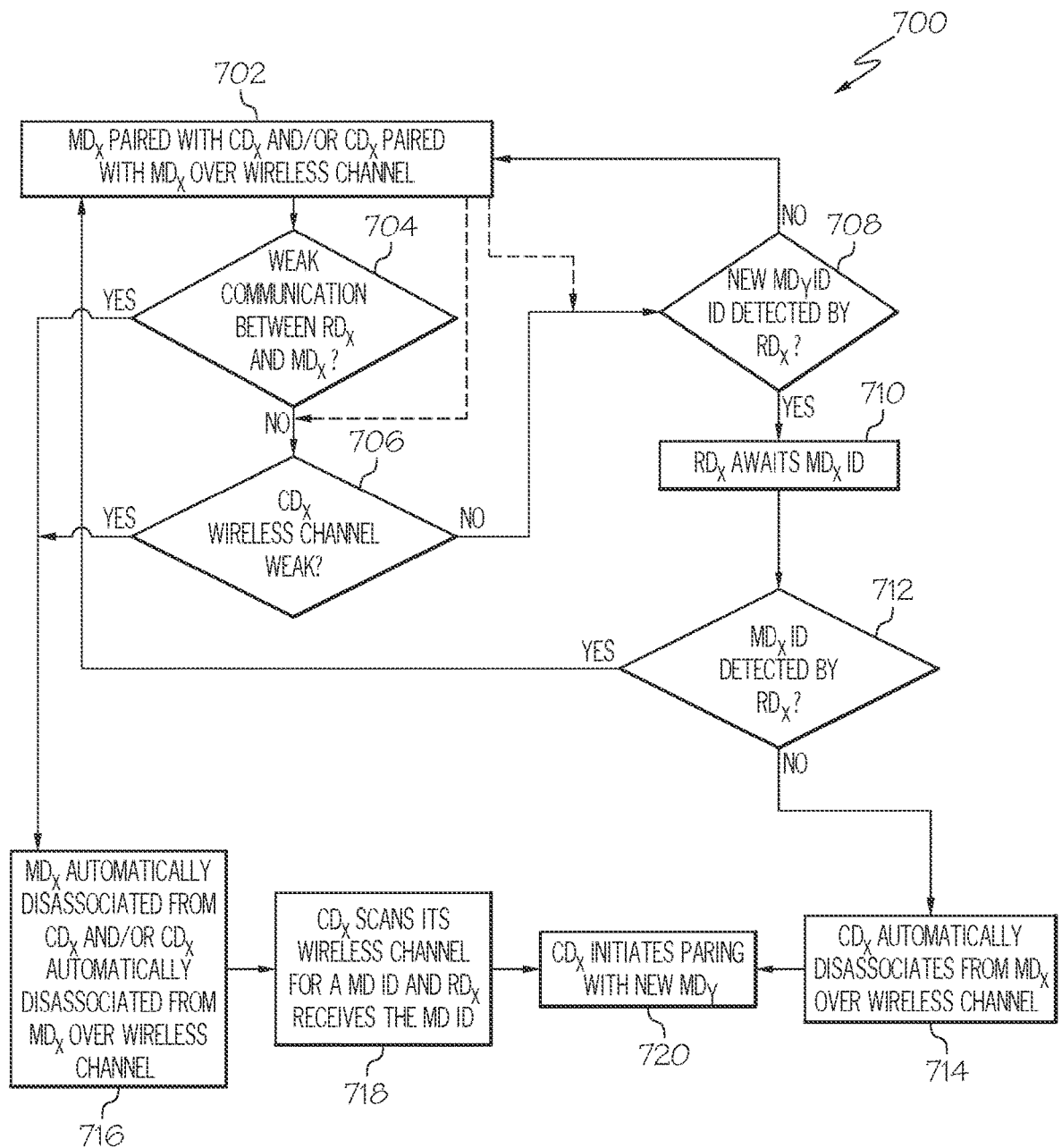
FIG. 7 depicts a flow diagram of an illustrative method for associating and disassociating medical devices, receiver devices, and control devices, according to one or more embodiments shown and described herein.

FIG. 7 depicts a flow diagram of an illustrative method 700 for associating and disassociating medical devices, receiver devices, and control devices, according to one or more embodiments of the present disclosure. Referring to FIG. 7, at block 702, a medical device $MD_X$ may be authentically paired with a control device $CD_X$ over a wireless communication channel (e.g., RF channel) and/or the control device $CD_X$ may be authentically paired with the medical device $MD_X$ over the wireless communication channel, as described herein. At decision block 704, the medical device $MD_X$ may determine whether an optical communication channel (e.g., IR channel) or wireless channel (e.g., RFID) with the receiver device $RD_X$ is weak (e.g., below a predetermined threshold signal strength) or the receiver device $RD_X$ may determine whether the optical or wireless communication channel with the paired medical device $MD_X$ is weak (e.g., below a predetermined threshold optical signal strength). In such aspects, the medical device $MD_X$ and/or the receiver device $RD_X$ may be configured to use the optical communication channel and/or wireless communication channel as a cue that the medical device $MD_X$ is being repositioned within the medical facility. If it is determined at decision block 704 that the optical or wireless communication channel is weak, the medical device $MD_X$ may be configured to automatically disassociate from the control device $CD_X$ and/or the control device $CD_X$ may be configured to automatically disassociate from the medical device $MD_X$ at block 716. According to further aspects, the medical device $MD_X$ may be configured to manually disassociate (e.g., upon a user actuating a disassociate button on the medical device $MD_X$) from a control device $CD_X$ and/or the control device $CD_X$ may be configured to manually disassociate (e.g., upon a user actuating a disassociate button on the control device $CD_X$) from a medical device $MD_X$. Upon disassociation, at block 718, the control device $CD_X$ may scan its wireless communication channel for medical device identifiers (e.g., MD IDs) and, at decision block 712, the control device $CD_X$ may initiate an authenticated pairing with a new medical device (e.g., $MD_Y$), as described herein.

If it is determined at decision block 704 that the optical communication channel and/or optical communication channel is not weak, the medical device $MD_X$ may determine whether a wireless communication channel (e.g., RF channel) with the authentically paired control device $CD_X$ is weak (e.g., below a predetermined threshold wireless signal strength) and/or the control device $CD_X$ may determine whether the wireless communication channel with the authentically paired medical device $MD_X$ is weak (e.g., below a predetermined threshold wireless signal strength) at block 714. If it is determined at decision block 706 that the wireless communication channel is weak, the medical device $MD_X$ may be similarly configured to automatically disassociate from the control device $CD_X$ and/or the control device $CD_X$ may be similarly configured to automatically disassociate from the medical device $MD_X$ at block 716.

At decision block 708, the control device $CD_X$ may determine whether a new or different medical device identifier $MD_Y$ ID is being received over its wireless communication channel. If it is determined at decision block 708 that no new or different medical device identifier $MD_Y$ ID is being received over its wireless communication channel, the control device $CD_X$ may remain authentically paired with the medical device $MD_X$ over its wireless communication channel at block 702. If it is determined at decision block 708 that a new or different medical device identifier $MD_Y$ ID is being received over its wireless communication channel, the receiver device $RD_X$ may be configured to await the medical device identifier $MD_X$ ID (via its optical channel or wireless channel) associated with its authentically paired medical device $MD_X$ at block 710. At decision block 712, if it is determined that the medical device identifier $MD_X$ ID has been detected, the control device $CD_X$ may remain authentically paired with the medical device $MD_X$ over its wireless communication channel at block 702. According to the aspects described in FIG. 7, the control device $CD_X$ may only be authentically paired with one medical device. Such an aspect may prevent the control device $CD_X$ from transmitting control inputs to more than one medical device. Here, it should be appreciated that other embodiments may include the control device $CD_X$ as authentically paired with multiple medical devices (e.g. in the same room, such as sub-spaces within a given room, or between different rooms). At decision block 712, if it is determined that the medical device identifier $MD_X$ ID has not been detected, the control device $CD_X$ may automatically disassociate from the medical device $MD_X$ over its wireless communication channel at block 714, and at block 720, the receiver device $RD_X$ and/or control device $CD_X$ may initiate authenticated pairing with the new or different medical device $MD_Y$.

Figure 8:
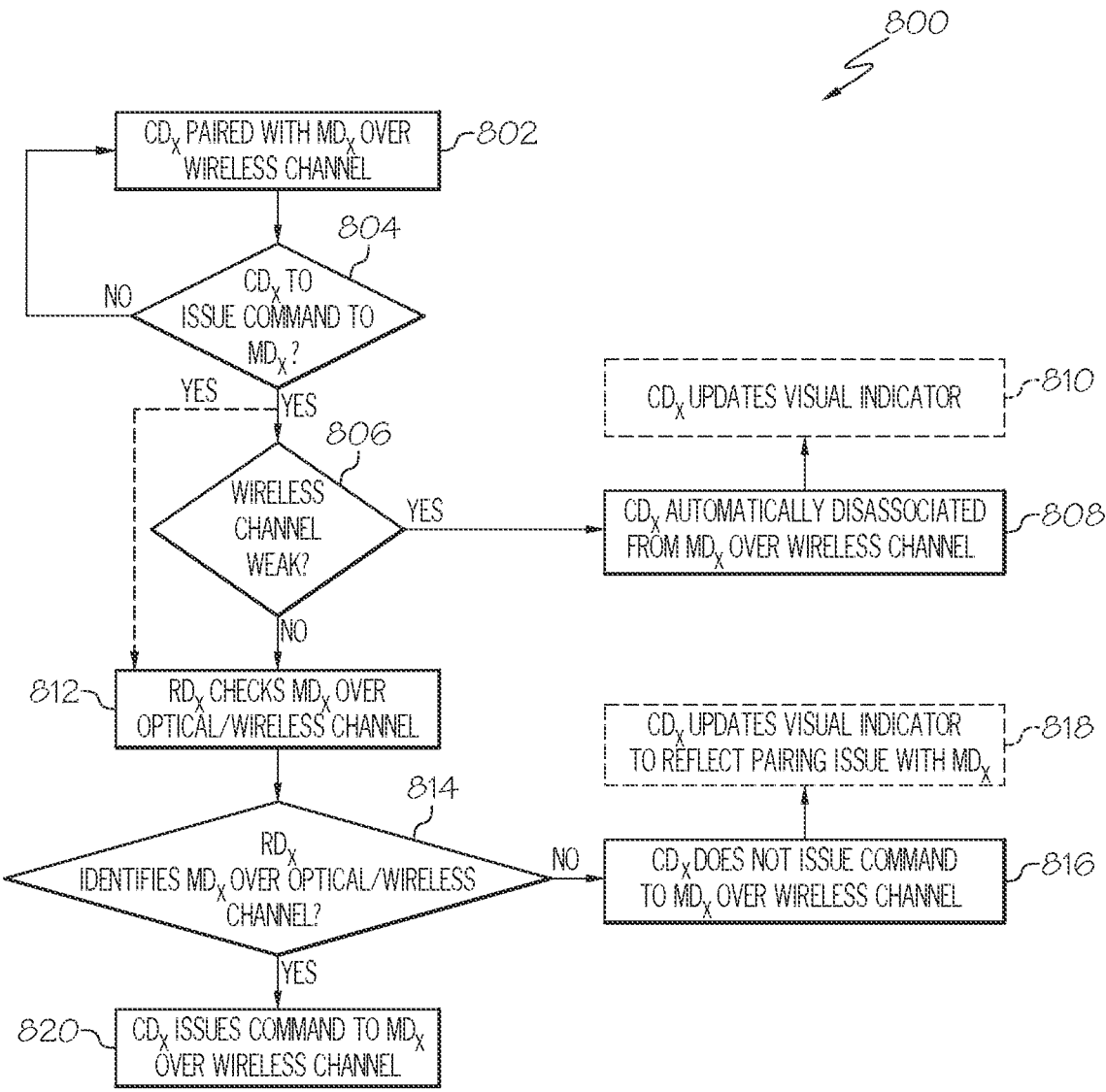
FIG. 8 depicts a flow diagram of an illustrative method for a control device to issue commands or control inputs to a paired medical device, according to one or more embodiments shown and described herein.

FIG. 8 depicts a flow diagram of an illustrative method 800 for a control device to issue commands or control inputs to a paired medical device, according to one or more embodiments of the present disclosure. According to various aspects, method 800 may be utilized for all control functions or only subject critical functions (e.g., actuating a motor, turning on a pump, and/or the like). Referring to FIG. 8, at block 802, a control device $CD_X$ may be authentically paired with a medical device $MD_X$ over its wireless communication channel, as described herein. At decision block 804, the control device $CD_X$ may be configured to determine (e.g., based on inputs received via user interface controls 246 of FIG. 2A) whether a command or control input is to be issued or transmitted to the medical device $MD_X$. If it is determined that a command or control input is not to be issued or transmitted to the medical device $MD_X$, the control device $CD_X$ may remain paired with the medical device identifier $MD_X$ over its wireless communication channel at block 802. If it is determined that a command or control input is to be issued or transmitted to the medical device $MD_X$, the control device $CD_X$ may be configured to determine whether the wireless communication channel is weak (e.g., below a predetermined threshold wireless signal strength) at decision block 806. If it is determined that the wireless communication channel is weak, the control device $CD_X$ may be configured to automatically disassociate from the medical device $MD_X$ over the wireless communication channel at block 808. At block 810 (shown in phantom as an optional step), the control device $CD_X$ may be configured to update its visual indicator to reflect the disassociation (e.g., LED off).

If it is determined that the wireless communication channel is not weak, the receiver device $RD_X$ may be configured, at block 812, to ping the medical device $MD_X$ over its optical communication channel (e.g., transmit an inquiry token) or wireless channel. According to an alternative aspect (e.g., shown in phantom) the method may proceed from decision block 804 directly to block 812 and proceed as described herein. At decision block 814, the receiver device $RD_X$ may be configured to determine whether it has received a response (e.g., response token, MD ID, and/or the like) from the medical device $MD_X$ over its optical communication channel or wireless communication channel. If it is determined that the receiver device $RD_X$ has not received a response from the medical device $MD_X$, the control device $CD_X$ may be configured, at block 816, to not issue or transmit the command or control input to the medical device $MD_X$. At block 818 (shown in phantom as an optional step), the control device $CD_X$ may be configured to update its visual indicator to reflect a pairing issue with the medical device $MD_X$ (e.g., medical device $MD_X$ not within line-of-sight of receiver device $RD_X$, indicator that the medical device $MD_X$ must be re-located to within the line-of-sight of the receiver device $RD_X$ to execute a control function). If it is determined that the receiver device $RD_X$ has received a response from the medical device $MD_X$, the control device $CD_X$ may be configured to, at block 820, issue the command or control input to the medical device $MD_X$ over its wireless communication channel. According to such aspects, if a medical device $MD_X$ is moved into an adjacent room (e.g., no longer within line-of-sight of the receiver device $RD_X$) the control device $CD_X$ is rendered unable to issue a command or control input to the medical device ($MD_X$) despite being otherwise able to over a strong wireless communication channel.

According to another embodiment, referring back to FIGS. 2A-2C, the control device 200 may include a location system 234, the receiver device 201 may include a location system 235, and the medical device 250 may include a location system 284. In such aspects, the medical device 250, receiver device 201, and/or the control device 200 may be configured to further transmit their respective location information (e.g., MD LOC, RD LOC, CD LOC) with their respective identifiers (e.g., MD ID, RD ID, CD ID) as described herein. In such aspects, the control device 200 may be configured to compare a received MD LOC (from a receiver device and/or the medical device) with its CD LOC as part of its determination as to whether to authentically pair with a medical device. In some aspects, an initial range (e.g., about 2 m to about 5 m radius) may be used for initial authentication and a control range (e.g., average size of room) may be used for disassociation. In further aspects, the control device 200 may be configured to adjust/correct its CD LOC and/or RD LOC as well as the received MD LOC using a medical facility location MF LOC location beacon with known coordinates. Likewise, the control device 200 may be configured to adjust/correct its CD LOC as well as the received MD LOC and/or RD LOC using a medical facility location MF LOC location beacon with known coordinates. According to various embodiments, such aspects may be used to further confirm the other authentication/identification methods as described herein.

According to the various embodiments described herein, each of the optical communication channel (e.g., IR channel) and the wireless communication channel (e.g., RFID channel) may be configured as a single-path communication channel or a dual-path communication channel. Furthermore, although the line-of-sight communication channel is described herein as an optical communication channel, the line-of sight communication channel may be any auxiliary line-of-sight communication channel that is guaranteed to be line-of-sight only. Namely, the line-of-sight communication channel is accessible to the device to be controlled (e.g., medical device) when visible from an identification point (e.g., receiver device).

It should now be understood that the systems and methods described herein are suitable for pairing a medical device and a control device via a receiver device using a line-of-sight optical link (e.g., IR channel). In particular, the systems and methods described herein automatically authenticate/identify a configurable, pairable wireless connection (e.g. RF channel) to be used to execute control actions for a medical device (e.g., rail-mounted lift) to ensure that the control inputs are coming from a control device (e.g., a tethered hand control unit, a wireless hand control unit, a wall-mounted control unit, a sling bar control unit, a coupling control unit, and/or the like) located in the same room as the medical device. Such systems and methods ensure that the control inputs coming from the control device are only directed to a medical device that is directly observable or visible to the control device user.

It should be appreciated that while elements are described as optional, this is only with respect to one or more illustrative embodiments, such as program instructions stored in 206 FIG. 2A and 207 FIG. 2B, as well as the features depicted in 234 FIG. 2A, 235 and 241 FIG. 2B, 284 and 288 FIG. 2C, 522 and 528 FIGS. 5, 620 and 626 FIG. 6, and 810 and 818 FIG. 8. That is, these elements may be required in other embodiments. In addition, the depiction of these elements as optional does not imply that the processes described with respect to other elements in the respective figures are required.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An automatically pairable control device, comprising:
   a first communication system configured to communicate via a first communication channel;
   a second communication system configured to communicate via a second communication channel different from the first communication channel;
   a processor; and
   a memory storing program instructions, the program instructions, when executed by the processor, cause the processor to:
      receive, from a medical device, a first identifier associated with the medical device over the first communication channel;
      receive, from a receiver device, a second identifier associated with the medical device over the second communication channel;
      determine that the first identifier received over the first communication channel matches the second identifier received over the second communication channel;
      automatically pair with the medical device associated with the matching identifier over the first communication channel; and
      disassociate from the medical device upon determining that at least one of the first communication channel or the second communication is associated with a signal below a predetermined threshold strength.

2. The automatically pairable control device of claim 1, wherein the first communication channel and the second communication channel are wireless communication channels.

3. The automatically pairable control device of claim 2, wherein:
   a third communication channel is a wireless communication channel or an optical communication channel; or
   the receiver device comprises a camera to visually detect a visual identifier located in a line of sight between the receiver device and the medical device.

4. The automatically pairable control device of claim 3, wherein the optical communication channel is an infrared (IR) communication channel and the wireless communication channels are radio frequency (RF) communication channels.

5. The automatically pairable control device of claim 1, wherein the program instructions, when executed by the processor, further cause the processor to:
   receive status data from the medical device over the first communication channel associated with the matching identifier; and
   transmit control inputs to the medical device over the first communication channel associated with the matching identifier, the control inputs for controlling a function of the medical device.

6. The automatically pairable control device of claim 1, wherein the program instructions, when executed by the processor, further cause the processor to:
   automatically disassociate from the medical device based on the first identifier is no longer being detected over the first communication channel or the second identifier no longer being detected over the first communication channel.

7. A system for automatically pairing devices, the system comprising:
an automatically pairable control device comprising:
a first communication system configured to communicate via a first communication channel;
a second communication system configured to communicate via a second communication channel different from the first communication channel;
a processor; and
a memory storing program instructions, the program instructions, when executed by the processor, causing the processor to:
receive, from an automatically pairable medical device, a first identifier associated with the medical device over the first communication channel;
receive, from a receiver device paired with the control device, a second identifier associated with the medical device over the second communication channel;
determine that the first identifier received over the first communication channel matches the second identifier received over the second communication channel;
automatically pair with the medical device associated with the matching identifiers over the first communication channel; and
disassociate from the medical device upon determining that at least one of the first communication channel or the second communication is associated with a signal below a predetermined threshold strength; and
the receiver device, paired with the control device, configured to:
receive, from the medical device, the second identifier associated with the medical device over a third communication channel different from the first communication channel and the second communication channel; and
transmit, to the control device, the second identifier associated with the medical device over the second communication channel.

8. The system of claim 7, wherein the first communication channel and the second communication channel are wireless communication channels.

9. The system of claim 8, wherein:
the third communication channel is a wireless communication channel or an optical communication channel; or
the receiver device comprises a camera to visually detect a visual identifier located in a line of sight between the receiver device and the medical device.

10. The system of claim 9, wherein the optical communication channel is an infrared (IR) communication channel and the wireless communication channels are radio frequency (RF) communication channels.

11. The system of claim 7, wherein the program instructions, when executed by the processor, further cause the processor to:
transmit control inputs to the medical device associated with the matching identifier, the control inputs for controlling a function of the medical device.

12. The system of claim 7, wherein the program instructions, when executed by the processor, further cause the processor to:
automatically disassociate the control device from the medical device based on the first identifier no longer being detected over the first communication channel or the second identifier no longer being detected over the first communication channel.

13. The system of claim 7, wherein:
the control device further comprises a visual indicator, and wherein the program instructions, when executed by the processor, further cause the processor to:
update the visual indicator to reflect that the medical device is not within a line-of-sight of the receiver device.

14. A method for automatically pairing a medical device with a control device via a receiver device, the method comprising:
receiving, via a first communication channel, a first identifier associated with a medical device;
receiving, via a second communication channel different from the first communication channel, a second identifier associated with the medical device;
determining that the first identifier received over the first communication channel matches the second identifier received over the second communication channel;
automatically pairing the control device with the medical device associated with the matching identifiers over the first communication channel; and
disassociating from the medical device upon determining that at least one of the first communication channel or the second communication is associated with a signal below a predetermined threshold strength.

15. The method of claim 14, wherein the first communication channel and the second communication channel are wireless communication channels.

16. The method of claim 15, wherein:
a third communication channel is a wireless communication channel or an optical communication channel; or
the receiver device comprises a camera to visually detect a visual identifier located in a line of sight between the receiver device and the medical device.

17. The method of claim 16, wherein the optical communication channel is an infrared (IR) communication channel and the wireless communication channels are radio frequency (RF) communication channels.

18. The method of claim 14, further comprising:
receiving status data from the medical device over the first communication channel associated with the matching identifier; and
transmitting control inputs to the medical device over the first communication channel associated with the matching identifier, the control inputs for controlling a function of the medical device.

* * * * *